United States Patent
Suzuki et al.

(10) Patent No.: US 9,088,997 B2
(45) Date of Patent: Jul. 21, 2015

(54) WIRELESS COMMUNICATION SYSTEM, MOBILE STATION DEVICE, AND WIRELESS RECEPTION METHOD

(75) Inventors: Shoichi Suzuki, Osaka (JP); Daiichiro Nakashima, Osaka (JP); Shohei Yamada, Osaka (JP); Yosuke Akimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 616 days.

(21) Appl. No.: 12/997,894

(22) PCT Filed: Jun. 23, 2009

(86) PCT No.: PCT/JP2009/061404
§ 371 (c)(1),
(2), (4) Date: Dec. 14, 2010

(87) PCT Pub. No.: WO2009/157443
PCT Pub. Date: Dec. 30, 2009

(65) Prior Publication Data
US 2011/0103290 A1 May 5, 2011

(30) Foreign Application Priority Data
Jun. 24, 2008 (JP) .................................. 2008-165110

(51) Int. Cl.
*H04H 20/71* (2008.01)
*H04W 72/12* (2009.01)
(Continued)

(52) U.S. Cl.
CPC ......... *H04W 72/1205* (2013.01); *H04L 5/0023* (2013.01); *H04L 5/0037* (2013.01);
(Continued)

(58) Field of Classification Search
None
See application file for complete search history.

(56) References Cited

U.S. PATENT DOCUMENTS 7,920,494 B2 * 4/2011 Stewart et al. ................ 370/310
8,131,286 B2 * 3/2012 Diepstraten et al. ....... 455/426.1
(Continued)

FOREIGN PATENT DOCUMENTS

| EP | 1983792 A1 | 10/2008 |
|---|---|---|
| JP | 2007-214822 A | 8/2007 |
| JP | 2007-221277 A | 8/2007 |

OTHER PUBLICATIONS

3GPP TS 36.211 V8.1.0 (Nov. 2007), Physical Channels and Modulation (Release 8).
(Continued)

*Primary Examiner* — Steven H Nguyen
(74) *Attorney, Agent, or Firm* — Birch, Stewart, Kolasch & Birch, LLP

(57) ABSTRACT

A base station device includes: a control signal generator that generates a signal of control data including items corresponding to the type of sub-frames to be allocated; a scheduling information signal generator that generates a signal of scheduling information indicating a sub-frame to be a first sub-frame among sub-frames specified by first-type sub-frame candidate information; and a multiplexer that allocates the signal of the control data to the first-type and second-type sub-frames, and allocates the signal of the scheduling information to the first-type sub-frame. A mobile station device includes: a frame-type determining unit that determines the type of each of received sub-frames based on the first-type sub-frame candidate information and the scheduling information; and a control data detector that detects, for each sub-frame, the control data including the items corresponding to the type indicated by the result of the determination by the frame-type determining unit. Accordingly, the processing load on reception of control data is reduced.

4 Claims, 22 Drawing Sheets

(51) Int. Cl.

| | | |
|---|---|---|
| *H04L 5/00* | (2006.01) | |
| *H04L 27/00* | (2006.01) | |
| *H04L 27/26* | (2006.01) | |
| *H04L 27/34* | (2006.01) | |
| *H04W 52/28* | (2009.01) | |
| *H04W 52/58* | (2009.01) | |
| *H04L 25/02* | (2006.01) | |
| *H04W 52/14* | (2009.01) | |
| *H04W 72/00* | (2009.01) | |

(52) U.S. Cl.
CPC ............ *H04L5/0064* (2013.01); *H04L 5/0094* (2013.01); *H04L 27/0008* (2013.01); *H04L 27/2602* (2013.01); *H04L 27/3488* (2013.01); *H04W 52/281* (2013.01); *H04W 52/58* (2013.01); *H04L 5/006* (2013.01); *H04L 5/0048* (2013.01); *H04L 25/0226* (2013.01); *H04W 52/146* (2013.01); *H04W 72/005* (2013.01); *H04W 72/1289* (2013.01)

(56) References Cited

U.S. PATENT DOCUMENTS

| | | | | |
|---|---|---|---|---|
| 8,155,648 | B2* | 4/2012 | Lee et al. .................... | 455/434 |
| 8,165,052 | B2* | 4/2012 | Qu et al. .................... | 370/312 |
| 8,174,995 | B2* | 5/2012 | Malladi .................... | 370/252 |
| 2008/0089312 | A1* | 4/2008 | Malladi .................... | 370/345 |
| 2008/0132263 | A1* | 6/2008 | Yu et al. .................... | 455/515 |
| 2008/0311902 | A1* | 12/2008 | Diepstraten et al. ....... | 455/426.1 |
| 2008/0311926 | A1* | 12/2008 | Fischer et al. ............. | 455/452.1 |
| 2009/0046617 | A1* | 2/2009 | Tenny et al. ................. | 370/312 |
| 2009/0073909 | A1* | 3/2009 | Cai et al. .................... | 370/312 |
| 2009/0122736 | A1* | 5/2009 | Damnjanovic et al. ....... | 370/311 |
| 2009/0149164 | A1* | 6/2009 | Cai .............................. | 455/414.2 |
| 2009/0156225 | A1* | 6/2009 | Angelow et al. ............. | 455/450 |
| 2009/0257371 | A1* | 10/2009 | Nishio ......................... | 370/312 |
| 2010/0048124 | A1* | 2/2010 | Lee et al. .................... | 455/3.01 |
| 2010/0103814 | A1* | 4/2010 | Chun et al. .................. | 370/225 |
| 2010/0118796 | A1* | 5/2010 | Yi et al. ....................... | 370/329 |
| 2010/0172281 | A1* | 7/2010 | Hus et al. ..................... | 370/312 |
| 2010/0174809 | A1* | 7/2010 | Chun et al. .................. | 709/221 |
| 2010/0189026 | A1* | 7/2010 | Lee et al. .................... | 370/312 |
| 2010/0189027 | A1* | 7/2010 | Ishida et al. ................. | 370/312 |
| 2010/0325504 | A1* | 12/2010 | Lee et al. ..................... | 714/748 |
| 2011/0070905 | A1* | 3/2011 | Kazmi et al. ................. | 455/507 |

OTHER PUBLICATIONS

3GPP TS 36.212 V8.1.0 (Nov. 2007), Multiplexing and channel coding (Release 8).

3GPP TS 36.300 V8.3.0 (Dec. 2007), Overall description; Stage 2 (Release 8).

R1-080621, "Physical-layer parameters to be configured by RRC", Ericsson, TSG-RAN WG1 #51bis, Jan. 14-18, 2008, Sevilla, Spain.

R1-080708, "Separate Rank and CQI Feedback in PUCCH" Texas Instruments, 3GPP TSG RAN WG1 #52, Feb. 11-15, 2008, Sorrento, Italy.

R1-080875, "On Antenna Configuration Detection and Transmission of Synchronization Signal", Ericsson, 3GPP TSG-RAN WG1 #52, Feb. 11-15, 2008, Sorrento, Italy.

European Search Report issued in European Patent Application No. 09770153.6 on Nov. 19, 2012.

European Search Report issued in European Patent Application No. 12003766.8 on Nov. 7, 2012.

Huawei: "MBSFN Subframe Allocation Signaling", 3GPP; R2-081889, Mobile Competence Centre; Sophia-Antipolis; France, vol. RAN WG2, no. Shenzhen, China; Mar. 31-Apr. 4, 2008, XP050139407.

Panasonic: "MBMS scheduling information and paging occasion relating to MBSFN subframe allocation", 3GPP; R2-080875, Mobile Competence Centre; Sophia-Antipolis; France, vol. RAN WG2, no. Sorrento, Italy, Feb. 11-14, 2008, XP050603556.

* cited by examiner

WIRELESS COMMUNICATION SYSTEM, MOBILE STATION DEVICE, AND WIRELESS RECEPTION METHOD

TECHNICAL FIELD

The present invention relates to a wireless communication system, a mobile station device, and a wireless reception method.

Priority is claimed on Japanese Patent Application No. 2008-165110, filed Jun. 24, 2008, the content of which is incorporated herein by reference.

BACKGROUND ART

As a third generation (3G) wireless access method for cellular mobile communication, W-CDMA (Wideband Code Division Multiple Access) has been standardized by the 3GPP (3rd Generation Partnership Project), and cellular mobile communication services using W-CDMA has been provided. Additionally, evolved universal terrestrial radio access (hereinafter, referred to as "E-UTRA") and evolved universal terrestrial radio access network (hereinafter, referred to as "E-UTRAN") have been considered by the 3GPP.

OFDM (Orthogonal Frequency Division Multiplexing), which is a multi-carrier transmission scheme, has been proposed for an E-UTRA downlink that is transmission from a base station device to a mobile station device. Additionally, DFT-Spread OFDM (Discrete Fourier Transform-Spread OFDM), which is a single-carrier transmission scheme, has been proposed for an E-UTRA uplink that is transmission from a mobile station device to a base station device.

In E-UTRA, a base station device BS1 performs wireless communication with mobile station devices UE1, UE2, and UE3. The E-UTRA downlink, which is wireless communication from the base station device BS1 to the mobile station devices UE1, UE2, and UE3, includes a downlink pilot channel, a downlink synchronization channel, a broadcast channel, a downlink control channel, a downlink shared data channel, a control format indicator channel, a downlink HARQ (Hybrid Automatic Repeat reQuest) indicator channel, and a multicast channel. The E-UTRA uplink, which is wireless communication from the mobile station devices UE1, UE2, and UE3 to the base station device BS1, includes an uplink pilot channel, a random access channel, an uplink control channel, and an uplink shared data channel.

<Unicast Sub-Frame>

FIG. 15 illustrates a schematic structure of an E-UTRA downlink radio frame (section 6.2 of Non-Patent Document 1). FIG. 15 illustrates, as an example, a schematic structure of a unicast sub-frame in a radio frame upon time-multiplexing of the downlink control channel and the downlink shared data channel. The horizontal and vertical axes shown in FIG. 15 denote time and frequency axes, respectively. The downlink radio frame includes multiple PRB (Physical Resource Block) pairs. The PRB pair is a unit of a radio resource assignment and the like for localized transmission and is defined by a frequency band (PRB bandwidth) and a time band (2 slots=1 sub-frame) which have predetermined widths.

Basically, one PRB pair includes two consecutive PRBs (PRB bandwidth×slot) in the time domain.

Regarding a sub-frame in which the downlink control channel and the downlink shared data channel are time-multiplexed (hereinafter, referred to as a "unicast sub-frame"), one PRB includes 12 subcarriers in the frequency domain and 7 OFDM symbols in the time domain. A system bandwidth is a communication bandwidth of the base station device. In the time domain, a slot includes 7 OFDM symbols, a sub-frame includes two slots, and a radio frame includes 10 sub-frames.

A unit defined by one subcarrier and one OFDM symbol is referred to as a resource element. In the downlink radio frame, multiple PRBs are allocated in the frequency direction according to the system bandwidth. A structure of an MBSFN sub-frame (Multicast/Broadcast over Single Frequency Network Sub-frame, hereinafter referred to as "multicast sub-frame"), in which a multicast channel in lieu of the downlink shared data channel is time-multiplexed with the downlink control channel, will be explained later.

At least the downlink shared data channel for transmitting information data and system information and the downlink control channel for transmitting control data are allocated to each unicast sub-frame.

The system information includes information required for the base station device and the mobile station device to communicate with each other. The system information is periodically transmitted to an unspecified number of mobile station devices on the broadcast channel and the downlink shared data channel. Items of system information allocated to the broadcast channel differ from those allocated to the downlink shared data channel. The system information allocated to the broadcast channel includes a system bandwidth, setting information of the downlink HARQ indicator channel, the number of transmit antennas, and the like. The system information allocated to the downlink shared data channel includes uplink and downlink transmit power control information, setting information of sub-frames for neighbor base station devices, setting information of a sub-frame for the base station device (serving base station device), and the like.

The downlink pilot channel for channel estimation of the downlink shared data channel and the downlink control channel is not illustrated in FIG. 15, and allocation thereof will be explained later. FIG. 15 shows a case where the downlink control channels are allocated to the first, second, and third OFDM symbols, which are counted from the starting position of a sub-frame, and the downlink shared data channels are allocated to other OFDM symbols. The number of OFDM symbols, to which the downlink control channels are allocated, varies in units of sub-frames.

Although not shown in FIG. 15, the control format indicator channel, which indicates the number of OFDM symbols forming the downlink control channels, is allocated to a predetermined frequency position of the first OFDM symbol. The downlink control channel is allocated to only the first OFDM symbol in one case, to the first and second OFDM symbols in another case, to the first to third OFDM symbols in another case, or the like. Allocation of the control format indicator channel will be explained later. Similarly, although not shown in FIG. 15, the downlink HARQ indicator channel is allocated to an OFDM symbol to which the downlink control channel is allocated. In other words, the downlink HARQ indicator channel is frequency-multiplexed with the downlink control channel. The downlink control channel and the downlink shared data channel are not allocated to the same OFDM symbol. Multiple pieces of uplink radio resource assignment information, downlink radio resource assignment information, transmit power command information, and the like are allocated to the downlink control channels in the unicast sub-frame. The details of information allocated to the downlink control channel will be explained later.

<Pilot Channel in Unicast Sub-Frame>

FIG. 16 illustrates allocation of the downlink pilot channels included in one PRB pair in an E-UTRA downlink unicast sub-frame (section 6.10.1 of Non-Patent Document 1). The horizontal and vertical axes shown in FIG. 16 denote time and frequency axes, respectively. A case where the base station device has four transmit antennas (a transmit antenna 1, a transmit antenna 2, a transmit antenna 3, and a transmit antenna 4) is explained here. A resource element assigned reference numeral R1 denotes a resource element of the downlink pilot channel to be transmitted from the transmit antenna 1. A resource element assigned reference numeral R2 denotes a resource element of the downlink pilot channel to be transmitted from the transmit antenna 2. A resource element assigned reference numeral R3 denotes a resource element of the downlink pilot channel to be transmitted from the transmit antenna 3. A resource element assigned reference numeral R4 denotes a resource element of the downlink pilot channel to be transmitted from the transmit antenna 4.

When the base station device has only two transmit antennas, the downlink control channels are transmitted on the resource elements R3 and R4 in the second OFDM symbol. The downlink shared data channels are transmitted on the resource elements R3 and R4 in the ninth OFDM symbol.

The broadcast channel and the downlink synchronization channel have little relation to the present invention, and therefore detailed explanations thereof are omitted here. However, the broadcast channel and the downlink synchronization channel are allocated to a predetermined resource element in a predetermined sub-frame.

<Structure of Multicast Sub-Frame>

FIG. 17 illustrates a schematic structure of a multicast sub-frame in the E-UTRA downlink (section 6.5 and 6.10.2 of Non-Patent Document 1). The horizontal and vertical axes shown in FIG. 17 denote time and frequency axes, respectively. In the multicast sub-frame, one PRB includes 12 sub-carriers in the frequency domain and 6 OFDM symbols in the time domain. In the time domain, a slot includes 6 OFDM symbols, and a sub-frame includes 2 slots.

At least the multicast channel for transmitting multiple MBMS data (Multimedia Broadcast/Multicast Service data, hereinafter referred to as "multicast data") and the downlink control channel for transmitting control data are allocated to each multicast sub-frame. The multicast data means broadly-defined multicast data indicating data addressed to multiple mobile station devices, which is a collective term indicating broadcast data addressed to an unspecified number of mobile station devices and narrowly-defined multicast data addressed to a specified number of mobile station devices. Hereinafter, simply-called multicast data indicates the broadly-defined multicast data. The downlink pilot channel used for channel estimation of the multicast channel and the downlink control channel is not shown in FIG. 17, and allocation thereof will be explained later. FIG. 17 shows a case where the downlink control channels are allocated to the first and second OFDM symbols counted from the starting position of the sub-frame, and the multicast channels are allocated to other OFDM symbols. However, the number of OFDM symbols, to which the downlink control channels are allocated, varies in units of sub-frames.

The number of OFDM symbols included in the multicast sub-frame is smaller than that of OFDM symbols included in the unicast sub-frame. However, the length of the OFDM symbol to which the multicast channels are allocated is larger than the length of an OFDM symbol in the unicast sub-frame. Consequently, the time length of a slot in the multicast sub-frame is equal to that of a slot in the unicast sub-frame. However, the length of the OFDM symbols in the multicast sub-frame, to which the downlink control channels (units hatched with diagonal lines) are allocated, is equal to the length of the OFDM symbols in the unicast sub-frame, to which the downlink control channels are allocated. To make the time length of the multicast sub-frame equal to that of the unicast sub-frame, extra samples (densely-hatched units) are allocated in the multicast sub-frame between the OFDM symbols for the downlink control channels and the OFDM symbols for the multicast channels. For example, "0" may be allocated as the extra sample.

Although not shown in FIG. 17, the control format indicator channel, which indicates the number of OFDM symbols forming the downlink control channels, is allocated to a predetermined frequency position of the first OFDM symbol. The downlink control channel is allocated to only the first OFDM symbol in one case, to the first and second OFDM symbols in another case, or the like.

Different from the unicast sub-frame, the downlink control channel is not allocated to the third OFDM symbol in the multicast sub-frame.

Similarly, although not shown in FIG. 17, the downlink HARQ indicator channel is allocated to an OFDM symbol to which the downlink control channels are allocated. In other words, the downlink HARQ indicator channel is frequency-multiplexed with the downlink control channel.

The downlink control channel and the multicast channel are not allocated to the same OFDM symbol. Uplink radio resource assignment information, transmit power command information, and the like are allocated to the downlink control channel in the multicast sub-frame. Downlink radio resource assignment information is not allocated to the downlink control channel in the multicast sub-frame. The details of information allocated to the downlink control channel will be explained later.

<Pilot Channel of Multicast Sub-Frame>

FIG. 18 illustrates allocation of the downlink pilot channels included in one PRB pair in the E-UTRA downlink multicast sub-frame (section 6.10.2 of Non-Patent Document 1). The horizontal and vertical axes shown in FIG. 18 denote time and frequency axes, respectively. A case where the base station device has five transmit antennas (a transmit antenna 1, a transmit antenna 2, a transmit antenna 3, a transmit antenna 4, and a transmit antenna 5) is explained here. A resource element assigned reference numeral R1 denotes a resource element of the downlink pilot channel to be transmitted from the transmit antenna 1. A resource element assigned reference numeral R2 denotes a resource element of the downlink pilot channel to be transmitted from the transmit antenna 2. A resource element assigned reference numeral R3 denotes a resource element of the downlink pilot channel to be transmitted from the transmit antenna 3. A resource element assigned reference numeral R4 denotes a resource element of the downlink pilot channel to be transmitted from the transmit antenna 4. A resource element assigned reference numeral R5 denotes a resource element of the downlink pilot channel to be transmitted from the transmit antenna 5.

The resource elements R1, R2, R3, and R4 are allocated to OFDM symbols forming the downlink control channels. Allocation of the resource elements R1, R2, R3, and R4 is the same as that in the case of the unicast sub-frame. The resource elements R1, R2, R3, and R4 are used for channel compensation on the downlink control channels. The resource element R5 is allocated to OFDM symbols forming the multicast channels, and is used for channel compensation on the multicast channels.

In the case of FIG. 18, the downlink control channels are transmitted using the transmit antennas 1 to 4, and therefore the resource elements R1, R2, R3, and R4 are necessary to perform channel compensation on the downlink control channels. For this reason, the downlink control channels are always allocated to both first and second OFDM symbols.

When the base station device has three transmit antennas, two antennas are used for transmitting the downlink control channels, and the remaining one antenna is used for transmitting the multicast channels. Thus, when the downlink control channels are transmitted from two transmit antennas, the downlink control channels are transmitted on the resource elements R3 and R4 in the second OFDM symbol.

<Multicast>

Multimedia Broadcast/Multicast Service (hereinafter, referred to as "multicast"), in which the base station device transmits data to an unspecified number of mobile station devices, has been proposed in E-UTRA (section 15 of Non-Patent Document 2).

Additionally, single-cell transmission for one base station device to transmit data to an unspecified number of mobile station devices, and a multi-cell transmission for multiple synchronized base station devices to simultaneously transmit the same data to an unspecified number of mobile station devices have been proposed as the multicast services. The multi-cell transmission has the following characteristics.

(1) An MBSFN area, in which multiple base stations are synchronized to simultaneously perform multicast (or broadcast) using the same frequency, is formed (hereinafter, referred to as "multicast area").

(2) Multiple base station devices in the multicast area simultaneously transmit the same multicast data to an unspecified number of mobile station devices.

(3) The mobile station device can combine the multicast data simultaneously transmitted from the base station devices.

(4) The multicast data is transmitted on a multicast channel in a multicast sub-frame.

(5) Each base station device transmits the multicast channel from one antenna.

The single-cell transmission has little relation to the present invention, and therefore explanations thereof are omitted here.

<Multicast-Dedicated Cell and Multicast/Unicast-Mixed Cell>

Regarding the base station device that performs the multi-cell transmission, there are a cell where the base station device transmits only multicast sub-frames using a multicast-dedicated frequency band (MBMS dedicated cell) and a cell where the base station device time-multiplexes the multicast sub-frame and the unicast sub-frame and performs transmission (MBMS/unicast mixed cell, hereinafter referred to as "multicast/unicast mixed cell") (section 15.2 of Non-Patent Document 2).

FIG. 19 illustrates a schematic structure of a radio frame for the multicast/unicast mixed cell where the multi-cell transmission is performed. The horizontal and vertical axes shown in FIG. 19 denote time and frequency axes. The first, fourth to sixth, and eighth sub-frames are unicast sub-frames, and the remaining sub-frames are multicast sub-frames. The radio frame of the multicast/unicast mixed cell where the multi-cell transmission is performed has the following characteristics.

(1) The multicast sub-frame and the unicast sub-frame are time-multiplexed.

(2) Multicast data are transmitted on a multicast channel in a multicast sub-frame.

(3) Information data and system information are transmitted on a unicast sub-frame, the information data are transmitted on the downlink shared data channel, and the system information is transmitted on the downlink shared data channel and the broad channel.

(4) The first and sixth sub-frames in the radio frame are always unicast sub-frames, and at least the synchronization channel is transmitted thereon.

The base station device, which transmits only multicast sub-frames using the multicast-dedicated frequency band, has little relation to the present invention, and therefore explanations thereof are omitted here.

<Multicast Sub-Frame Allocation Pattern>

Regarding the base station device performing the multi-cell transmission, sub-frame allocation information for reserving multicast sub-frames, i.e., information for specifying sub-frames to which multicast sub-frames can be allocated (MSAP: MBSFN sub-frame allocation pattern, hereinafter referred to as "multicast sub-frame allocation pattern," which is also referred to by the 3GPP as "MBSC: MBSFN sub-frame configuration" or "MBSFN sub-frame allocation signaling") is transmitted by system information on the downlink shared data channel (Non-Patent Document 3).

FIG. 20 illustrates a multicast sub-frame allocation pattern for the multicast/unicast mixed cell in which the multi-cell transmission is performed. The horizontal and vertical axes shown in FIG. 20 denote time and frequency axes, respectively. The multicast sub-frame allocation pattern indicates an allocation of sub-frames reserved for multicast sub-frames in a period. If the multicast sub-frame allocation pattern is not changed in the next period, the same sub-frames are reserved as the multicast sub-frames in the next period of the multicast sub-frame allocation pattern. A period of the multicast sub-frame allocation pattern has not been determined in E-UTRA. However, it has been determined to decide one value from 40 ms to 320 ms (from 40 sub-frames to 320 sub-frames where 1 sub-frame=1 ms) (Non-Patent Document 4).

For example, when a period of the multicast sub-frame allocation pattern is 80 ms (80 sub-frames), 64 bits are required to express the multicast sub-frame allocation pattern by a bit map method (which may be bits that are 16 bits less than 80 bits since the first and sixth sub-frames in the radio frame (=10 sub-frames) are fixed as the unicast sub-frames).

<Dynamic Scheduling Information>

FIG. 21 illustrates information concerning sub-frames on which multicast data allocated to the multicast channels are transmitted, among sub-frames specified by the multicast sub-frame allocation pattern transmitted by the base station performing multi-cell transmission (hereinafter, referred to as "dynamic scheduling information"). The horizontal and vertical axes shown in FIG. 21 denote time and frequency axes, respectively. For simplification of explanations, only the multicast channels to which dynamic scheduling information and multicast data are allocated are shown, and other channels such as the downlink control channels and the downlink shared data channels are not shown. The dynamic scheduling information is denoted as a rectangle that is hatched with diagonal lines. The multicast data is denoted as a rectangle that is not hatched.

In FIG. 21, the dynamic scheduling information indicates to which sub-frames multicast data 1 to 5 are allocated. The dynamic scheduling information is multiplexed with multicast data 1 in one sub-frame.

The dynamic scheduling information has the following characteristics (Non-Patent Document 5).

(1) The dynamic scheduling information indicates a sub-frame to which one or multiple multicast data are allocated.

(2) The dynamic scheduling information may be multiplexed with multicast data in a sub-frame.

(3) Multiple dynamic scheduling information pieces may be included in a period of the multicast sub-frame allocation pattern.

<Reuse of Multicast Sub-Frame Allocatable Sub-Frame (MBSFN Sub-Frame) as Unicast Sub-Frame>

In the multicast/unicast mixed cell where multi-cell transmission is performed, when the amount of multicast data is smaller than the amount of data that can be multicast with the applied multicast sub-frame allocation pattern, such as when the base station device loses part of multicast data to be transmitted on the multicast channel, it has been considered that a sub-frame affected by the smaller amount of data, which is included in multicast sub-frame allocatable sub-frames specified by the multicast sub-frame allocation pattern, is not used for transmitting multicast data, but is used as the unicast sub-frame.

Additionally, a method has been considered in which the mobile station device detects or is informed that multicast data is not transmitted on the sub-frame indicated as multicast sub-frame allocatable by the multicast sub-frame allocation pattern (section 15.3.3 of Non-Patent Document 2).

<DCI (Downlink Control Information) Format>

Multiple control data pieces are allocated to the downlink control channel. There are at least three types of control data pieces to be allocated to the downlink control channel, which are the following.

(1) Radio resource assignment control data on the downlink shared data channel for one mobile station device (hereinafter, referred to as "downlink radio resource assignment information")

(2) Radio resource assignment control data on the uplink shared data channel for one mobile station device (hereinafter, referred to as "uplink radio resource assignment information")

(3) Control data including a set of transmit power control commands on the uplink shared data channel and the uplink control channel (hereinafter, referred to as "transmit power commands") for one mobile station device (hereinafter, referred to as "transmit power command information") (section 5.3.3. of Non-Patent Document 6).

<DL (Downlink) Radio Resource Assignment Information>

The downlink radio resource assignment information includes at least one set of radio resource assignment information on the downlink shared data channel, a mobile station identifier, a modulation scheme, an encoding rate, a retransmission parameter, and a transmit power command on the uplink control channel. The downlink radio resource assignment information is grouped into the following three groups according to purposes.

(1) Downlink radio resource assignment information for single input multiple output (hereinafter, "SIMO"), of which the radio resource assignment information on the downlink shared data channel (hereinafter, referred to as "downlink radio resource assignment information 1") is the smallest in size (2) Downlink radio resource assignment information for SIMO, of which the radio resource assignment information on the downlink shared data channel is larger in size than the downlink radio resource assignment information 1 (hereinafter, referred to as "downlink radio resource assignment information 2")

(3) Downlink radio resource assignment information for multiple input multiple output (hereinafter, "MIMO") including two sets of modulation schemes, encoding rates, and retransmission parameters, of which the radio resource assignment information on the downlink shared data channel is the same in size as the downlink radio resource assignment information 2 (hereinafter, referred to as "downlink radio resource assignment information 3")

The bit lengths (sizes) of the three downlink radio resource assignment information pieces differ from one another. Since the downlink shared data channel is not allocated to the multicast sub-frame, the downlink radio resource assignment information is not allocated to the downlink control channel in the multicast sub-frame. The transmit power command included in the downlink radio resource assignment information is a transmit power command on the uplink control channel used for transmitting a reception response signal in response to the downlink shared data channel.

<UL (Uplink) Radio Resource Assignment Information>

The uplink radio resource assignment information includes a mobile station identifier, uplink radio resource assignment information, a modulation scheme, an encoding rate, a retransmission parameter, and the like. When an uplink system bandwidth is equal to a downlink system bandwidth, the bit length (size) of the uplink radio resource assignment information is equal to the bit length (size) of the downlink radio resource assignment information 1.

<Transmit Power Control (TPC)>

The transmit power command information includes a transmit power command to multiple mobile station devices and a mobile station group identifier. The bit length (size) of the transmit power command information equals that of the uplink radio resource assignment information.

<Coding>

FIG. 22 is a flowchart illustrating an example procedure of coding control data to be allocated to the downlink control channel (section 3.3 of Non-Patent Document 6). First, control data received from the controller is multiplexed with an error detection code. The error detection code is generated from control data using a predetermined generating polynomial. Then, the control data multiplexed with the error detection code is convolutionally-coded.

Then, the convolutionally-coded control data is rate-matched, and then outputted to the QPSK (Quadrature Phase Shift Keying) modulator. The details of rate matching will be explained later.

Then, the rate-matched control data is QPSK-modulated, and then is mapped to resource elements of the downlink control channels. A combination of resource elements of the downlink control channels to which the control data are mapped is limited by the size of the QPSK-modulated control data. When the base station device transmits the downlink control channel using the transmit diversity, a transmit diversity process is performed after the QPSK modulation, and then a mapping to resource elements of the downlink control channels is performed.

<Rate Matching>

Rate matching is to change the encoding rate by a repetition process or a puncture process on the convolutionally-coded control data in order to make the size of the convolutionally-coded control data equal to the size of the physical resource of the downlink control channel to which the control data is mapped.

As the sizes of the rate-matched control data, four sizes are considered in E-UTRA. For example, rate matching is performed so as to make the sizes equal to 36 resource elements, 72 resource elements, 144 resource elements, and 288 resource elements after the QPSK modulation is performed.

Patterns for the repetition process or the puncture process, which adjusts the different-sized control data to different-sized physical resources, differ. In other words, different rate matching patterns are used for different-sized control data, such as the downlink radio resource assignment information 2 and the uplink radio resource assignment information.

When the encoding rate is changed such that the same-sized control data before rate matching are changed to different-sized control data after the rate matching, different rate matching patterns are used.

<Blind Decoding>

FIG. 23 is a flowchart illustrating an example procedure of decoding control data to be allocated to the downlink control channel. For each sub-frame, the mobile station device monitors whether or not control data addressed to the mobile station device is allocated to the downlink control channel. However, the mobile station device has no information about how many control data pieces of what item addressed to the mobile station device are present, to what size of resource elements the rate matching is performed, and to which resource elements the control data pieces are mapped. For this reason, blind decoding is performed in which decoding processes are performed for all possible combinations of resource elements and rate matching.

Specifically, the mobile station device QPSK-demodulates all the resource elements forming the downlink control channels first (S1). Then, the mobile station device selects one possible combination of the number and allocation of resource elements to which control data are mapped (S2). Then, the mobile station device selects one of the possible sizes of the control data before rate matching, and then performs a reverse process to the rate matching (hereinafter, referred to as "rate dematching"), which is determined based on the selected size of the control data and the number of resource elements (S3).

Next, the mobile station device convolutionally-decodes the rate-dematched control data (S4), and then performs error detection using an error detection code (S5). Here, an error detection code, such that the calculation result of the error detection becomes the identifying number of the mobile station device to which the control data is addressed, is used.

If no error is detected after the convolutional decoding, in other words, if the calculation result of the error detection becomes the identifying number of the mobile station device (S6: NO), the mobile station device recognizes that the control data is the control data addressed to the mobile station device. Further, the mobile station device confirms the structure of the control data, and thereby recognizes whether the control data is the uplink radio resource assignment information, the downlink radio resource assignment information, or the transmit power command information (S7). If all pieces of the uplink radio resource assignment information, the downlink radio resource assignment information, and the transmit power command information are decoded (S8: NO), the mobile station device terminates the decoding process.

If there is undecoded control data among the uplink radio resource assignment information, the downlink radio resource assignment information, and the transmit power command information (S8: YES), the mobile station device sets an untried combination of the number and allocation of resource elements to which control data are mapped, and sets an untried size of the control data before rate matching (S9). Then, the mobile station device repeats the operations from S2 in which a resource element is extracted from the downlink control channel.

If any error is detected in the error detection process in step S5 (S6: YES), and if there are an untried combination of the number and allocation of resource elements to which the control data are mapped and an untried size of the control data before rate matching (S10: YES), the mobile station device sets these items (S9). Then, the mobile station device repeats the operations from step S2 in which a resource element is extracted from the downlink control channel.

If the control data decoding process is performed for all the combinations of the numbers and allocations of resource elements to which control data are mapped and for all the sizes of the control data before the rate matching (S10: NO), the mobile station device terminates the decoding process.

When the base station device transmits the downlink control channel using the transmit diversity, the QPSK demodulation in step S1 is performed after a transmit diversity combining process is performed.

CITATION LIST

Non Patent Literature

Non-Patent Document 1: 3GPP TS36.211 V8.1.0 (2007-11), Physical Channels and Modulation (Release 8)
Non-Patent Document 2: 3GPP TS36.300 V8.3.0 (2007-12), Overall description; Stage 2 (Release 8)
Non-Patent Document 3: 3GPP TSG RAN1 #51b, Sevilla, Spain, 14-18 Jan., 2008, R1-080621 "Physical-layer parameters to be configured by RRC"
Non-Patent Document 4: 3GPP TSG RAN2 #61, Sorrento, Italy, 11-15 Feb., 2008, R2-080708 "LS response on Signaling of MBSFN Sub-frame Allocation"
Non-Patent Document 5: 3GPP TSG RAN2 #61, Sorrento, Italy, 11-15 Feb., 2008, R2-080875 "MBMS scheduling information and paging occasion relation to MBMS sub-frame allocation"
Non-Patent Document 6: 3GPP TS36.212 V8.1.0 (2007-11), Multiplexing and channel coding (Release 8)

DISCLOSURE OF THE INVENTION

Problems to be Solved by the Invention

In the conventional E-UTRA, however, the mobile station device cannot recognize how many control data pieces of what item, which are addressed to the mobile station device, are included in the downlink control channel, to what size of resource elements the rate matching is performed, and to which resource element the control data is mapped. For this reason, the mobile station device has to perform the blind decoding process for all possible combinations of resource elements and rate matching, thereby causing a problem in which there is a heavy processing load on reception of the downlink control channels.

The present invention is made in consideration of such situations. An object of the present invention is to provide a wireless communication system, a mobile station device, and a wireless communication method, which can reduce the processing load on reception of the downlink control channels.

Means for Solving the Problems (1) The present invention has been made to solve the above problems. A wireless communication system of the present invention includes: a base station device that time-multiplexes a first-type sub-frame to which first-type data is allocated and a second-type sub-frame to which second-type data is allocated, and performs transmission; and a plurality of mobile station devices, each of which receives a signal addressed to each of the plurality of mobile station devices, the signal being transmitted by the base station device. The base station device includes: a dynamic scheduling information signal generator that generates a signal of dynamic scheduling information indicating a first-type sub-frame to which the first-type data is allocated among sub-frames specified by first-type sub-frame candidate information, the first-type sub-frame candidate information specifying first-type sub-frames to which the first-type data is allocatable; a multiplexer that allocates the signal of the dynamic scheduling information to the first-type sub-frame; and a transmitter that transmits a signal resulting from multiplexing by the multiplexer. Each of the plurality of mobile station devices includes: a receiver that receives a signal transmitted from the base station device; a dynamic scheduling information detector that detects the dynamic scheduling information from the signal received; and a frame-type determining unit that determines a type of each sub-frame included in the signal received based on the first-type sub-frame candidate information and the dynamic scheduling information.

(2) Regarding the above wireless communication system, the base station device further includes a control signal generator that generates a signal of control data including items corresponding to the type of each sub-frame. The multiplexer allocates the signal of the control data to the first-type sub-frame and the second-type sub-frame. The mobile station device further includes: a control data detector that detects, for each sub-frame included in the signal received, the control data including the items corresponding to the type indicated by a result of the determination by the frame-type determining unit.

(3) Regarding the above wireless communication system, the first-type data comprises broadcast data or multicast data addressed to the plurality of mobile station devices, and the second-type data includes unicast data addressed to one of the plurality of mobile station devices.

(4) Regarding the wireless communication system, the dynamic scheduling information is allocated to a sub-frame specified by the first-type sub-frame candidate information, and the dynamic scheduling information indicates a first-type sub-frame to which the first-type data is allocated among sub-frames that are specified by the first-type sub-frame candidate information and are positioned posterior to a sub-frame to which the dynamic scheduling information is allocated.

(5) Regarding the wireless communication system, the first-type sub-frame candidate information specifies a sub-frame to which the first-type sub-frame is allocatable among a sub-frame set included in a predetermined period, at least one piece of the dynamic scheduling information is allocated in the predetermined period, and the dynamic scheduling information specifies sub-frames to which data sequences comprising consecutive first-type data pieces are allocated, the first-type sub-frames being allocated in the predetermined period.

(6) Regarding the wireless communication system, the control data detector uses the data size corresponding to the items upon detecting the control data including the items corresponding to the type indicated by the result of the determination by the frame-type determining unit.

(7) Regarding the wireless communication system, the items corresponding to the type indicated by the result of the determination includes uplink radio resource assignment information and uplink transmit power command information, when the type indicated by the result of the determination is the first-type sub-frame.

(8) Regarding the wireless communication system, the items corresponding to the type indicated by the result of the determination includes at least downlink radio resource assignment information, when the type indicated by the result of the determination is the second-type sub-frame.

(9) Regarding the wireless communication system, the items corresponding to the type indicated by the result of the determination further includes uplink radio resource assignment information and uplink transmit power command information, when the type indicated by the result of the determination is the second-type sub-frame.

(10) A mobile station device of the present invention receives a signal addressed to the mobile station device from signals in which a first-type sub-frame to which first-type data is allocated and a second-type sub-frame to which second-type data is allocated are time-multiplexed. The mobile station device includes: a receiver that receives a signal transmitted by a base station device; a dynamic scheduling information detector that detects, from the signal received, dynamic scheduling information indicating a first-type sub-frame to which the first-type data is allocated among sub-frames specified by first-type sub-frame candidate information, the first-type sub-frame candidate information specifying a first-type sub-frame to which the first-type data is allocatable; and a frame-type determining unit that determines a type of each sub-frame included in the signal received based on the first-type sub-frame candidate information and the dynamic scheduling information.

(11) A wireless reception method of the present invention is provided for a mobile station device that receives a signal addressed to the mobile station device from signals in which a first-type sub-frame to which first-type data is allocated and a second-type sub-frame to which second-type data is allocated are time-multiplexed. The wireless reception method includes: a first process of the receiving a transmitted by a base station device; a second process of detecting, from the signal received, dynamic scheduling information indicating a first-type sub-frame to which the first-type data is allocated among sub-frames specified by first-type sub-frame candidate information, the first-type sub-frame candidate information specifying a first-type sub-frame to which the first-type data is allocatable; and a third process of determining a type of each sub-frame included in the signal received based on the first-type sub-frame candidate information and the dynamic scheduling information.

Effects of the Invention

According to the present invention, the type of each sub-frame of the received signal is determined based on the first sub-frame candidate information and the dynamic scheduling information. Then, the control data including the item corresponding to the type indicated by the determination result is detected, thereby enabling a reduction in the processing load on reception of the control data.

BEST MODE FOR CARRYING OUT THE INVENTION

Hereinafter, an embodiment of the present invention is explained with reference to the drawings. A wireless communication system according to the present embodiment includes multiple base station devices 1, and multiple mobile station devices 2 receiving signals transmitted from the base station devices 1.

Figure 1:
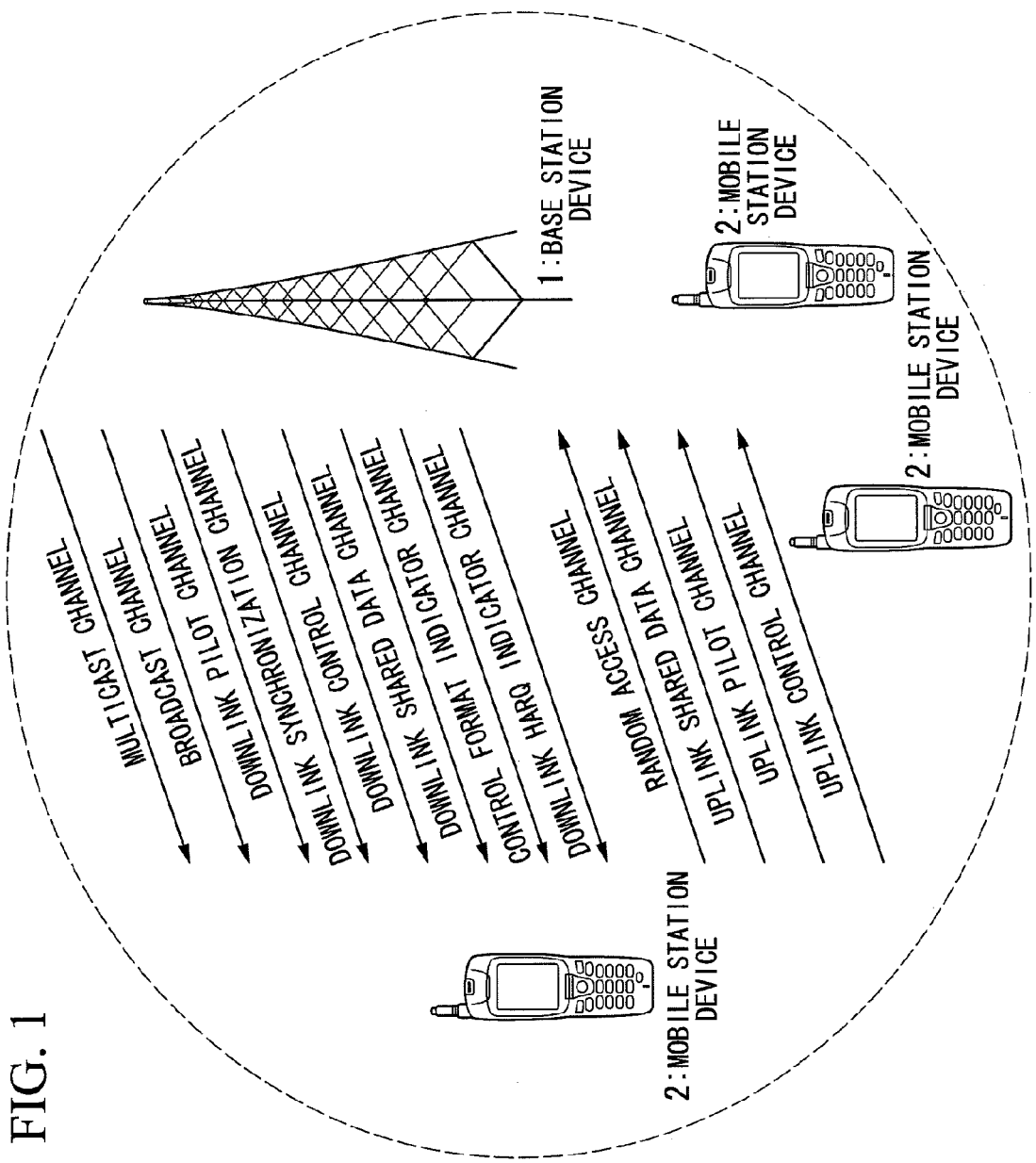
FIG. 1 illustrates a schematic structure of channels in a wireless communication system according to an embodiment of the present invention.

FIG. 1 illustrates a schematic structure of channels in a wireless communication system of the present embodiment. A downlink from the base station device 1 to the mobile station device 2 includes a downlink pilot channel, a downlink synchronization channel, a broadcast channel, a downlink control channel, a downlink shared data channel, a control format indicator channel, a downlink HARQ (Hybrid Automatic Repeat reQuest) indicator channel, and a multicast channel.

An uplink from the mobile station device 2 to the base station device 1 includes an uplink pilot channel, a random access channel, an uplink control channel, and an uplink shared data channel.

<Radio Frame>

Figure 2:
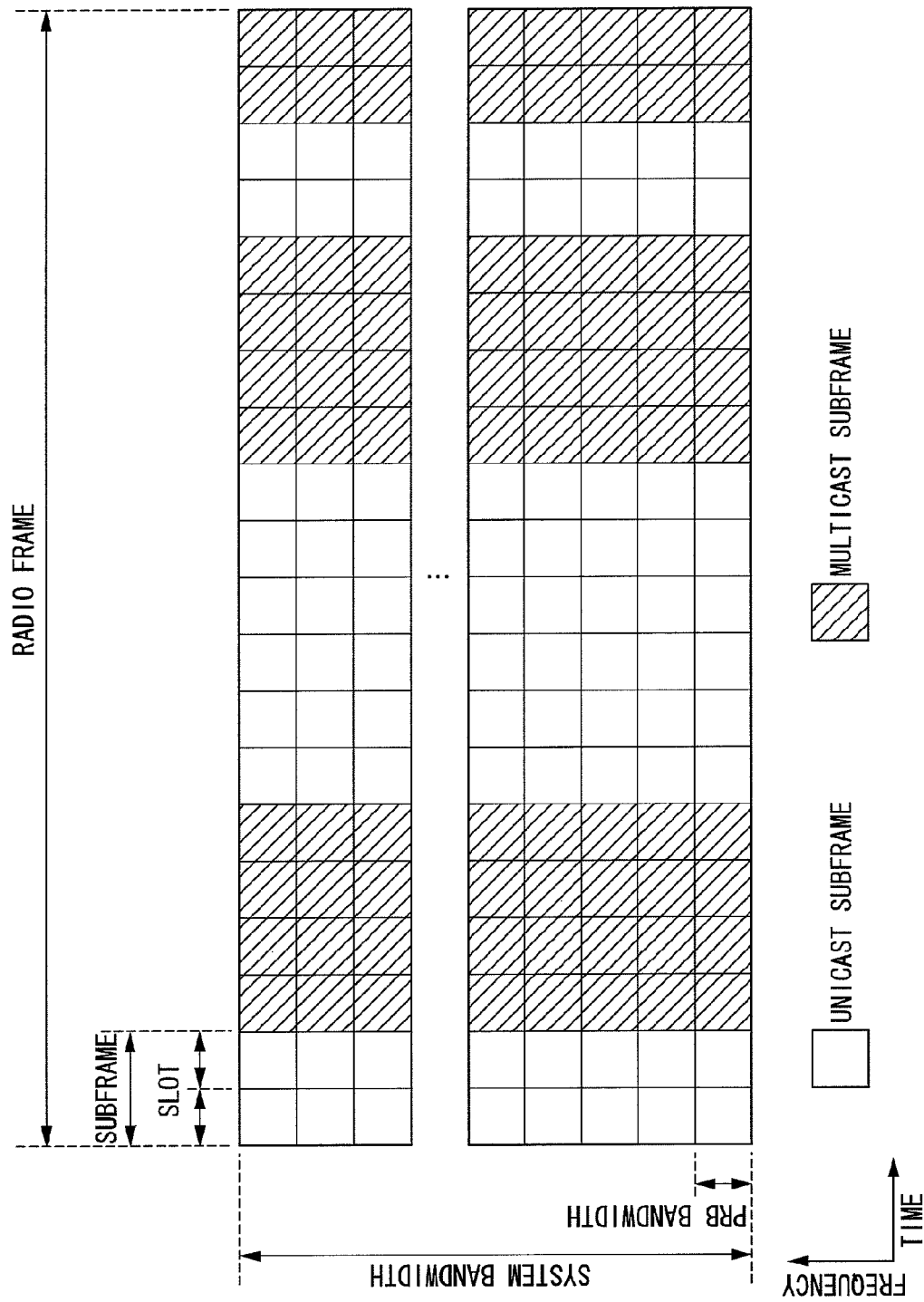
FIG. 2 illustrates a schematic structure of a downlink radio frame (radio resource) from the base station device 1 to the mobile station device 2 according to the present embodiment.

FIG. 2 illustrates a schematic structure of a downlink radio frame (radio resource) from the base station device 1 to the mobile station device 2 according to the present embodiment. The horizontal and vertical axes shown in FIG. 2 denote time and frequency axes, respectively. The downlink radio frame includes multiple PRB (Physical Resource Block) pairs. The PRB pair is a unit of radio resource assignment or the like for localized transmission and is defined by a frequency band (PRB bandwidth) and a time band (2 slots=1 sub-frame) which have predetermined widths. Basically, one PRB pair includes two consecutive PRBs in the time domain.

A system bandwidth is a communication bandwidth of the base station device 1. Multiple PRBs according to the system bandwidth are allocated in the frequency direction in the downlink radio frame. In the time domain, a sub-frame (time frame) includes two slots, and a radio frame includes 10 sub-frames. Additionally, a multicast (MBSFN: Multicast/Broadcast over Single Frequency Network) sub-frame (first-type sub-frame) forming multicast channels to which multicast (MBMS: Multimedia Broadcast/Multicast Service) data (first-type data) is allocated and a unicast sub-frame (second-type sub-frame) forming the downlink shared data channels to which information data (second-type data) and system information is allocated are time-multiplexed. Here, the multicast data means broadly-defined multicast data, which is a collective term indicating broadcast data addressed to an unspecified number of mobile station devices and narrowly-defined multicast data addressed to a specified number of mobile station devices.

<Unicast Sub-Frame>

Figure 3:
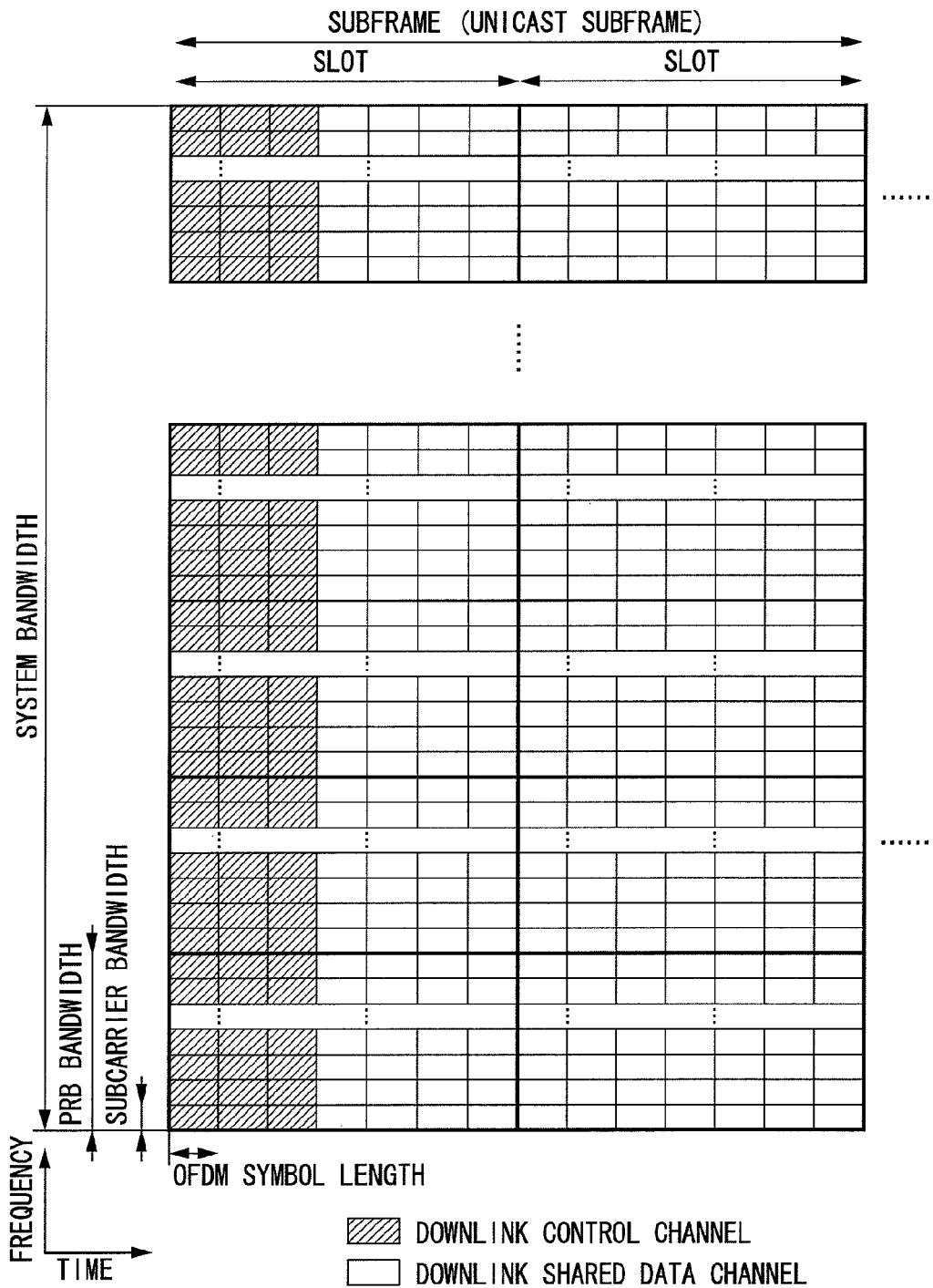
FIG. 3 illustrates a schematic structure of a unicast sub-frame according to the present embodiment.

FIG. 3 illustrates a schematic structure of a unicast sub-frame of the present embodiment. The horizontal and vertical axes shown in FIG. 3 denote time and frequency axes, respectively. In the unicast sub-frame, one PRB includes 12 sub-carriers in the frequency domain and 7 OFDM symbols in the time domain.

At least the downlink shared data channel for transmitting information data and system information and the downlink control channel for transmitting control data are allocated in each unicast sub-frame. The downlink pilot channel for channel estimation of the downlink shared data channel and the downlink control channel is not illustrated in FIG. 3. FIG. 3 shows a case where the downlink control channels are allocated to the first, second, and third OFDM symbols in the sub-frame which are expressed by rectangles hatched with diagonal lines, and the downlink shared data channels are allocated to other OFDM symbols expressed by non-hatched rectangles. The number of OFDM symbols to which the downlink control channels are allocated varies in units of sub-frames.

Although not shown in FIG. 3, the control format indicator channel, which indicates the number of OFDM symbols forming the downlink control channels, is allocated to a predetermined frequency position of the first OFDM symbol. The downlink control channel is allocated to only the first OFDM symbol in one case, to the first and second OFDM symbols in another case, to the first to third OFDM symbols in another case, or the like. Similarly, although not shown in FIG. 3, the downlink HARQ indicator channel is allocated to an OFDM symbol to which the downlink control channel is allocated. In other words, the downlink HARQ indicator channel is frequency-multiplexed with the downlink control channel. The downlink control channel and the downlink shared data channel are not allocated to the same OFDM symbol. At least a downlink radio resource assignment information piece is allocated to the downlink control channel in the unicast sub-frame. In addition to the downlink radio resource assignment information piece, multiple uplink radio resource assignment information pieces and a transmit power command information piece are allocated thereto in the present embodiment.

<Multicast Sub-Frame>

Figure 4:
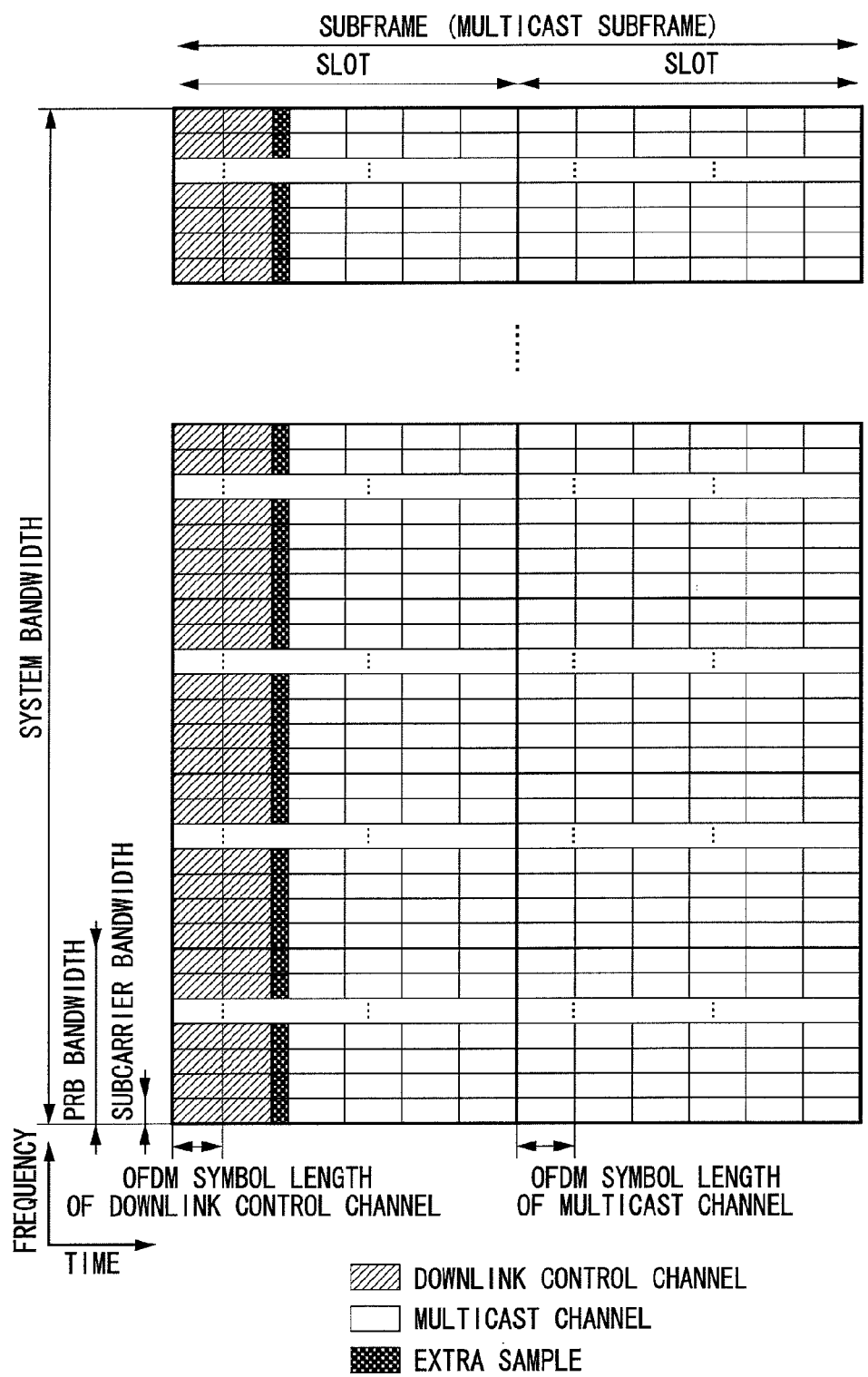
FIG. 4 illustrates a schematic structure of a multicast sub-frame according to the present embodiment.

FIG. 4 illustrates a schematic structure of a multicast sub-frame of the present embodiment. The horizontal and vertical axes denote time and frequency axes, respectively. One PRB in the multicast sub-frame includes 12 subcarriers in the frequency domain and 6 OFDM symbols in the time domain. In the time domain, a slot includes 6 OFDM symbols, and a sub-frame includes 2 slots.

At least the multicast channels for transmitting multicast data are allocated to each multicast sub-frame. An illustration of the downlink pilot channel used for channel estimation of the multicast channel and the downlink control channel is omitted in FIG. 4. FIG. 4 shows a case where the downlink control channels are allocated to the first and second OFDM symbols in the sub-frame which are expressed by hatched rectangles, and the downlink shared data channels are allocated to other OFDM symbols expressed by non-hatched rectangles. The number of OFDM symbols, to which the downlink control channels are allocated, varies in units of sub-frames.

The number of OFDM symbols included in the multicast sub-frame is smaller than that of OFDM symbols included in the unicast sub-frame. However, the length of the OFDM symbol to which the multicast channels are allocated is larger than the length of an OFDM symbol in the unicast sub-frame. Consequently, the time length of a slot of the multicast frame equals that of a slot of the unicast frame. However, the length of the OFDM symbol in the multicast sub-frame, to which the downlink control channels (units hatched with diagonal lines) are allocated, is equal to the length of the OFDM symbol in the unicast sub-frame, to which the downlink control channels are allocated. To make the time length of the multicast sub-frame equal to that of the unicast sub-frame, extra samples (shaded units) are allocated in the multicast sub-frame between the OFDM symbols for the downlink control channels and the OFDM symbols for the multicast channels.

Although not shown in FIG. 4, the control format indicator channel, which indicates the number of OFDM symbols forming the downlink control channels, is allocated to a predetermined frequency position of the first OFDM symbol. The downlink control channel is allocated to the first OFDM symbol in one case, to the first and second OFDM symbols in another case, or the like. Similarly, although not shown in FIG. 4, the downlink HARQ indicator channel is allocated to an OFDM symbol to which the downlink control channels are allocated. In other words, the downlink HARQ indicator channel is frequency-multiplexed with the downlink control channel.

The downlink control channel and the multicast channel are not allocated to the same OFDM symbol. Multiple pieces of uplink radio resource assignment information and transmit power command information are allocated to the downlink control channel in the multicast sub-frame.

<Dynamic Scheduling Information>

Figure 5:
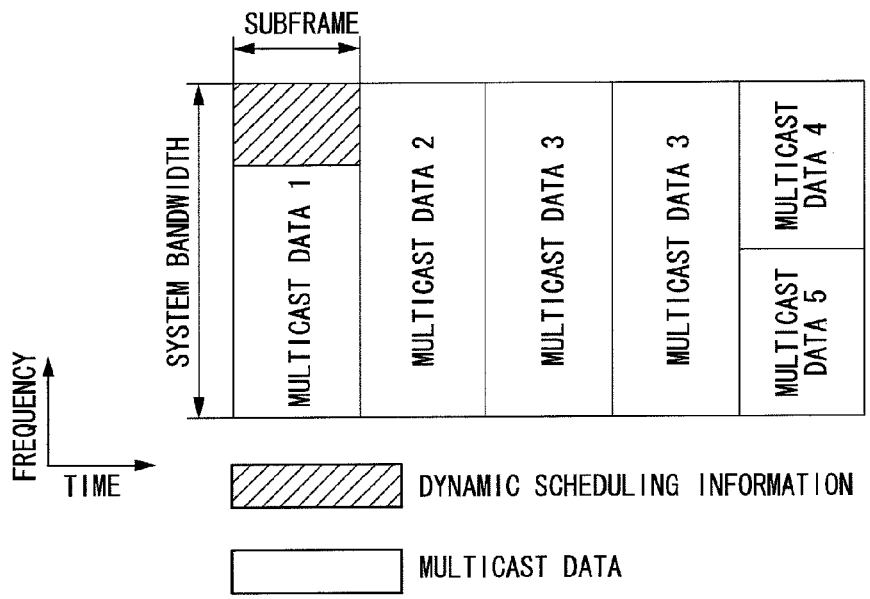
FIG. 5 illustrates dynamic scheduling information according to the present embodiment.

FIG. 5 illustrates dynamic scheduling information of the present embodiment. The horizontal and vertical axes shown in FIG. 5 denote time and frequency axes, respectively. For simplification of explanations, only the multicast channels to which dynamic scheduling information and multicast data are allocated are shown, and other channels such as the downlink control channel and the downlink shared data channels are not shown. The dynamic scheduling information is denoted as a rectangle that is hatched with diagonal lines. The multicast data is denoted as a rectangle that is not hatched.

A multicast sub-frame allocation pattern is information indicating sub-frames to which multicast sub-frames can be allocated, among a sub-frame set included in a predetermined period (the details thereof will be explained later). One or multiple pieces of the dynamic scheduling information are allocated in a period of the multicast sub-frame allocation pattern. The dynamic scheduling information indicates, among sub-frames specified by the multicast sub-frame allocation pattern, a sub-frame to which a data sequence including consecutive multicast data pieces (respective multicast data 1 to 5 in the case of FIG. 5), i.e., a sub-frame used as a multicast sub-frame. The multicast sub-frame allocation pattern is inputted to the base station device 1 from an external unit and is stored therein.

For example, the dynamic scheduling information stores: information indicative of the multicast data 1 and information indicative of the first sub-frame specified by the multicast sub-frame allocation pattern, which are correlated to each other; information indicative of the multicast data 2 and information indicative of the second sub-frame specified by the multicast sub-frame allocation pattern, which are correlated to each other; and other multicast data 3 to 5 which are correlated to information indicative of sub-frames in a similar manner. The stored information which is correlated to the multicast data 1 to 5 may include not only the information indicative of sub-frames, but also the sizes of the multicast data 1 to 5, or information indicative of positions thereof in the sub-frames.

The multicast data 1 to 5 indicate consecutive multicast data pieces, each of which is assigned to a service. For example, the multicast data 1 to 3 are image data of one image stream service. Multicast data 4 and 5 are audio data of one audio stream service. The dynamic scheduling information is multiplexed with the multicast data 1 in the sub-frame.

The dynamic scheduling information has the following characteristics.

(1) The dynamic scheduling information indicates a sub-frame to which one or multiple multicast data are allocated.

(2) The dynamic scheduling information may be multiplexed with multicast data in a sub-frame.

(3) Multiple dynamic scheduling information pieces may be included in a period of the multicast sub-frame allocation pattern.

<Outline of Base Station Device 1>

The base station device 1 of the present embodiment time-multiplexes a multicast sub-frame to which multicast data is allocated and a unicast sub-frame to which unicast data is allocated, and transmits the multiplexed sub-frame. The base station device 1 allocates system information to the downlink shared data channel in a unicast sub-frame, and transmits the system information. The system information includes the multicast sub-frame allocation pattern (first-type sub-frame candidate information) that is information concerning timing of transmitting the multicast sub-frame and received from an external unit. Further, the base station device 1 transmits the dynamic scheduling information indicative of a sub-frame to which one or multiple multicast data are allocated among sub-frames specified by the multicast sub-frame allocation pattern. If no multicast data to be transmitted is included in the sub-frames specified by the multicast sub-frame allocation pattern, or if part of multicast data is lost, the base station device 1 uses the sub-frame as unicast sub-frame, allocates information data to the unicast sub-frame, and transmits the information data.

<Block Diagram of Base Station Device 1>

Figure 6:
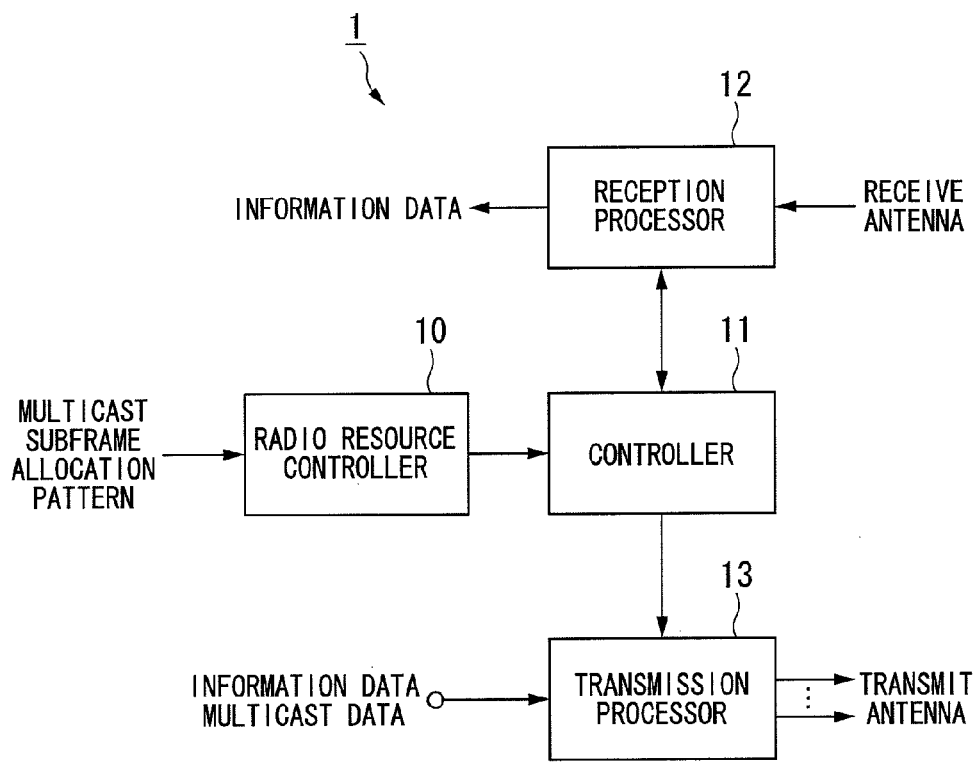
FIG. 6 is a schematic block diagram illustrating the configuration of a base station device 1 according to the present embodiment.

FIG. 6 is a schematic block diagram illustrating the configuration of the base station device 1 according to the present embodiment of the present invention.

As shown in FIG. 6, the base station device 1 includes a radio resource controller 10, a controller 11, a reception processor 12, and a transmission processor 13. The radio resource controller 10 manages a discontinuous transmission and reception cycle with the mobile station device 2, a modulation scheme, an encoding rate, a transmit power, radio resource assignment of the downlink shared data channels, allocation of multicast sub-frames and unicast sub-frames, the number of OFDM symbols forming the downlink control channels, multiplexing of the downlink control channel, the downlink shared data channel, the multicast channel, and the like. The radio resource controller 10 outputs a control signal for specifying these management items to the controller 11, and informs the mobile station device 2 of the control data, the system information, or the dynamic scheduling information via the controller 11 and the transmission processor 13. Regarding the multicast and unicast allocation, the radio resource controller 10 receives a multicast sub-frame allocation pattern from an external unit, and determines to which type of the multicast sub-frame and the unicast sub-frame each sub-frame is set, based on the multicast sub-frame allocation pattern and the data amount of the multicast data to be transmitted.

To control the transmission processor 13 and the reception processor 12 based on the control signal received from the radio resource controller 10, the controller 11 outputs the control signal to the transmission processor 13 and the reception processor 12. The controller 11 controls the transmission processor 13 and the reception processor 12 with respect to a modulation scheme of transmission and reception signals, a setting of an encoding rate, a setting of the number of OFDM symbols forming the downlink control channels, a setting of allocation of each channel to a resource element, allocation of multicast sub-frames and unicast sub-frames according to the multicast sub-frame allocation pattern, generation of the downlink pilot channels, and the like. The controller 11 generates control data to be allocated to the downlink control channel, and instructs the transmission processor 13 to perform transmission. Additionally, the controller 11 generates system information to be allocated to the downlink shared data channel, such as the multicast sub-frame allocation pattern. Then, the controller 11 instructs the transmission processor 13 to transmit the system information with the information data. Further, the controller 11 generates information to be allocated to the multicast channel, and instructs the transmission processor 13 to perform transmission.

Based on the input from controller 11, the transmission processor 13 generates the downlink control channel, the downlink shared data channel, the multicast channel, the downlink pilot channel, and the control format indicator channel. Then, the transmission processor 13 multiplexes each of the generated channels with the downlink radio frame, and transmits the multiplexed signal to each mobile station device 2 via multiple antennas, such as four transmit antennas. Operations concerning the broadcast channel, the downlink synchronization channel, and the downlink HARQ indicator channel have little relation to the present invention, and therefore explanations thereof are omitted here.

Based on the input from the controller 11, the reception processor 12 receives, via the receive antenna, the uplink control channel, the uplink shared data channel, the uplink pilot channel, and the random access channel, which are transmitted by each mobile station device 2. An operation concerning the uplink has little relation to the present invention, and explanations thereof are omitted here.

<Block Diagram of Transmission Processor 13 of Base Station Device 1>

Figure 7:
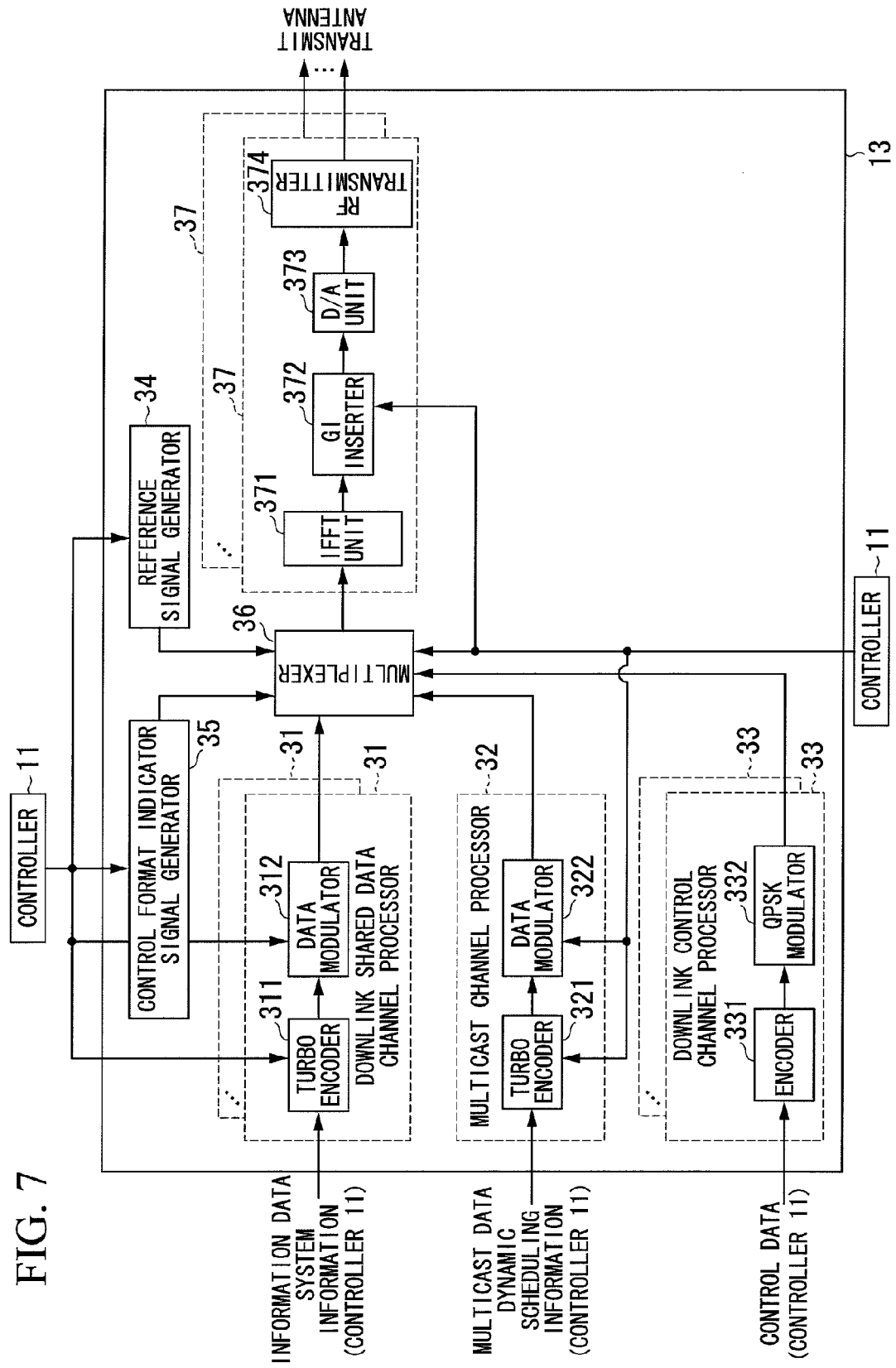
FIG. 7 is a schematic block diagram illustrating the internal configuration of a transmission processor 13 of the base station device 1 according to the present embodiment.

FIG. 7 is a schematic block diagram illustrating the internal configuration of the transmission processor 13 of the base station device 1 according to the present embodiment. The transmission processor 13 of the base station device 1 includes: multiple downlink shared data channel processors 31; a multicast channel processor 32; multiple downlink control channel processors 33; a reference signal (downlink pilot channel) generator 34; a control format indicator signal generator 35; a multiplexer 36; and per-antenna transmission processors 37 for respective transmit antennas. Each set of the downlink shared data channel processor 31, the downlink control channel processor 33, and the per-antenna transmission processor (transmitters) 37 for each transmit antenna has a similar configuration and function. For this reason, only one set thereof is representatively explained hereinafter.

<Downlink Shared Data Channel Processor 31>

The downlink shared data channel processor 31 performs a downlink shared data channel process on the information data received from an external unit and the system information received from the controller 11.

In other words, each downlink shared data channel processor 31 receives information data addressed to any one of the mobile station devices 2, and then performs turbo coding and data modulation to generate a signal addressed to the one of the mobile station devices 2. Meanwhile, each downlink shared data channel processor 31 receives system information such as the multicast sub-frame allocation pattern, and then performs turbo coding and data modulation to generate a signal addressed to an unspecified number of mobile station devices 2. The downlink shared data channel processor 31 includes a turbo encoder 311 and a data modulator 312.

<Multicast Channel Processor 32>

The multicast channel processor (scheduling information signal generator) 32 performs a multicast channel process on the multicast data received from an external unit and the dynamic scheduling information received from the controller 11. In other words, the multicast channel processor 32 receives the multicast data and the dynamic scheduling information, and then performs turbo coding and data modulation to generate a signal addressed to an unspecified number of mobile station devices 2. The multicast channel processor 32 includes a turbo encoder 321 and a data modulator 322.

<Downlink Control Channel Processor 33>

The downlink control channel processor (control signal generator) 33 performs a downlink control channel process on the control data received from the controller 11. In other words, each downlink control channel processor 33 receives control data addressed to any one of the mobile station devices 2, which is downlink radio resource assignment information or uplink radio resource assignment information addressed to the one of the mobile station devices 2, and then performs coding and QPSK modulation to generate a signal of the control data. Meanwhile, each downlink control channel processor 33 receives control data addressed to multiple mobile station devices 2, which is transmit power command information addressed to an unspecified number of mobile station devices 2, and then performs coding and QPSK (Quadrature Phase Shift keying) modulation to generate a signal of the control data. The modulation scheme is not limited to the QPSK modulation.

The downlink control channel processor 33 generates a signal of control data including items according to the type of sub-frame to which the signal generated by the processor is allocated. For example, items of the control data allocated to the unicast sub-frame include uplink radio resource assignment information, downlink radio resource assignment information, and transmit power command information. Items of the control data allocated to the multicast sub-frame include uplink radio resource assignment information and transmit power command information. The downlink control channel processor 33 includes an encoder 331 and a QPSK modulator 332.

<Encoder 331 of Downlink Control Channel Processor 33>

Figure 8:
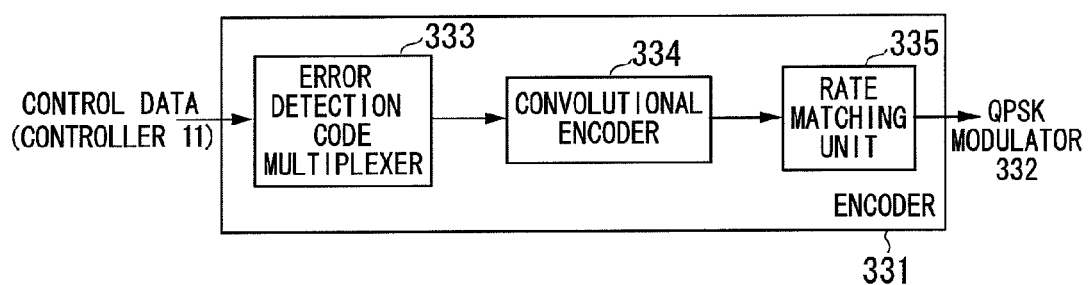
FIG. 8 is a block diagram illustrating an internal configuration of an encoder 331 of a downlink control channel processor 33 according to the present embodiment.

FIG. 8 is a block diagram illustrating an internal configuration of the encoder 331 of the downlink control channel processor 33. The encoder 331 of the downlink control channel processor 33 includes an error detection code multiplexer 333, a convolutional encoder 334, and a rate matching unit 335.

The encoder 331 of the downlink control channel processor 33 performs coding on the control data received from the controller 11. In other words, the error detection code multiplexer 333 included in the encoder 331 of the downlink control channel processor 33 multiplexes an error detection code generated using a predetermined generating polynomial with the control data. The convolutional encoder 334 convolutionally-codes the control data multiplexed with the error detection code. The rate matching unit 335 performs a repetition process and a puncture process on the convolutionally-coded control data, and encodes a signal of the control data to a length corresponding to any one of four predetermined resource element sizes.

The four predetermined resource element sizes are 36 resource elements, 72 resource elements, 144 resource elements, and 288 resource elements. The length corresponding to the resource element size is the length upon QPSK modulation, which is the 2-bit length with respect to one resource element.

<Multiplexer 36>

The multiplexer 36 allocates, to the unicast sub-frame, the signal of the information data and the system information generated by the downlink shared data channel processor 31. Additionally, the multiplexer 36 allocates, to the multicast sub-frame, the signal of the multicast data and the dynamic scheduling information which are generated by the multicast channel processor 32. Further, the multiplexer 36 allocated the signal of the control data generated by the downlink control channel processor 33 to the unicast sub-frame and the multicast sub-frame.

<Per-Transmit Antenna Processor 37>

The per-transmit antenna transmission processor 37 transmits, via each transmit antenna, a signal resulting from the multiplexing by the multiplexer 36 for each transmit antenna. The per-transmit antenna transmission processor 37 includes: an IFFT (Inverse Fast Fourier Transform) 371; a GI (Guard Interval) inserter 372; a D/A (Digital/Analog) unit 373; and an RF (Radio Frequency) transmitter 374.

<Explanation of Transmission Process of Base Station Device 1>

<Downlink Shared Data Channel Processor 31>

Each of the downlink shared data channel processors 31 performs a baseband process for performing OFDM transmission of the information data received from the external unit and the system information received from the controller 11 (hereinafter, the information data and the system information are collectively called "data"). According to the instruction on the encoding rate from the controller 11, the turbo encoder 311 performs error correction coding using a turbo code for enhancing the error resistance of the input data. The data modulator 312 modulates the data having been subjected to the error correction coding by the turbo encoder 311, using the modulation scheme specified by the controller 11 among modulation schemes, such as QPSK, 16QAM (16 Quadrature Amplitude Modulation), and 64QAM (64 Quadrature Amplitude Modulation).

<Multicast Channel Processor 32>

The multicast channel processor 32 performs a baseband process for performing OFDM transmission of the multicast data received from the external unit and the dynamic scheduling information received from the controller 11. According to the instruction on the encoding rate from the controller 11, the turbo encoder 321 performs error correction coding using a turbo code for enhancing the error resistance of the inputted multicast data and the dynamic scheduling information. The data modulator 322 modulates the multicast data and the dynamic scheduling information, which have been subjected to the error correction coding by the turbo encoder 321, using the modulation scheme specified by the controller 11 among modulation schemes, such as QPSK, 16QAM (16 Quadrature Amplitude Modulation), and 64QAM (64 Quadrature Amplitude Modulation).

<Downlink Control Channel Processor 33>

Each of the downlink control channel processors 33 performs a baseband process for performing OFDM transmission of the control data. The encoder 331 multiplexes the control data received from the controller 11 with error detection codes for the error detection encoder 333 to detect errors of the control data. The convolutional encoder 334 performs error correction coding using a convolutional code for enhancing the error resistance of the control data. The rate matching unit 335 performs a repetition process and a puncture process for matching the size upon the multiplexer 36 multiplexing the control data with the downlink control channel. The QPSK modulator 332 performs QPSK modulation on the control data coded by the encoder 331.

Based on the control signal indicating the type of each sub-frame which is received from the controller 11, the reference signal generator 34 generates a reference signal for the downlink control channel, the downlink shared data channel, and the like which are transmitted on the downlink pilot channel from each transmit antenna of the base station device 1, and a reference signal for the multicast channel.

Based on the control signal from the controller 11, the control format indicator signal generator 35 generates a control format indicator signal for transmitting information indicative of OFDM symbols forming the downlink control channels on the control format indicator channel.

<Multiplexer 36>

Based on the control signal from the controller 11, the multiplexer 36 allocates to resource elements for each transmit antenna: the transmission signal of the data addressed to each mobile station device 2 which have been subjected to the encoding, the modulation, and the like and outputted from each downlink shared data channel processor 31; the transmission signal of the multicast data addressed to the mobile station device 2 which have been subjected to the encoding, the modulation, and the like and outputted from each multicast channel processor 32; the transmission signal of the control data which have been subjected to the encoding, the modulation, and the like and outputted from the downlink control channel processor 33; the control format indicator signal; and the reference signal.

The multiplexer 36 does not multiplex, to the same sub-frame, the transmission signal generated by the downlink shared data channel processor 31 and the transmission signal generated by the multicast channel processor 32. In other words, the multiplexer 36 allocates the transmission signal generated by the downlink shared data channel processor 31 to a resource element in the unicast sub-frame. Meanwhile, the multiplexer 36 allocates the transmission signal generated by the multicast channel processor 32 to a resource element in the multicast sub-frame.

Figure 9:
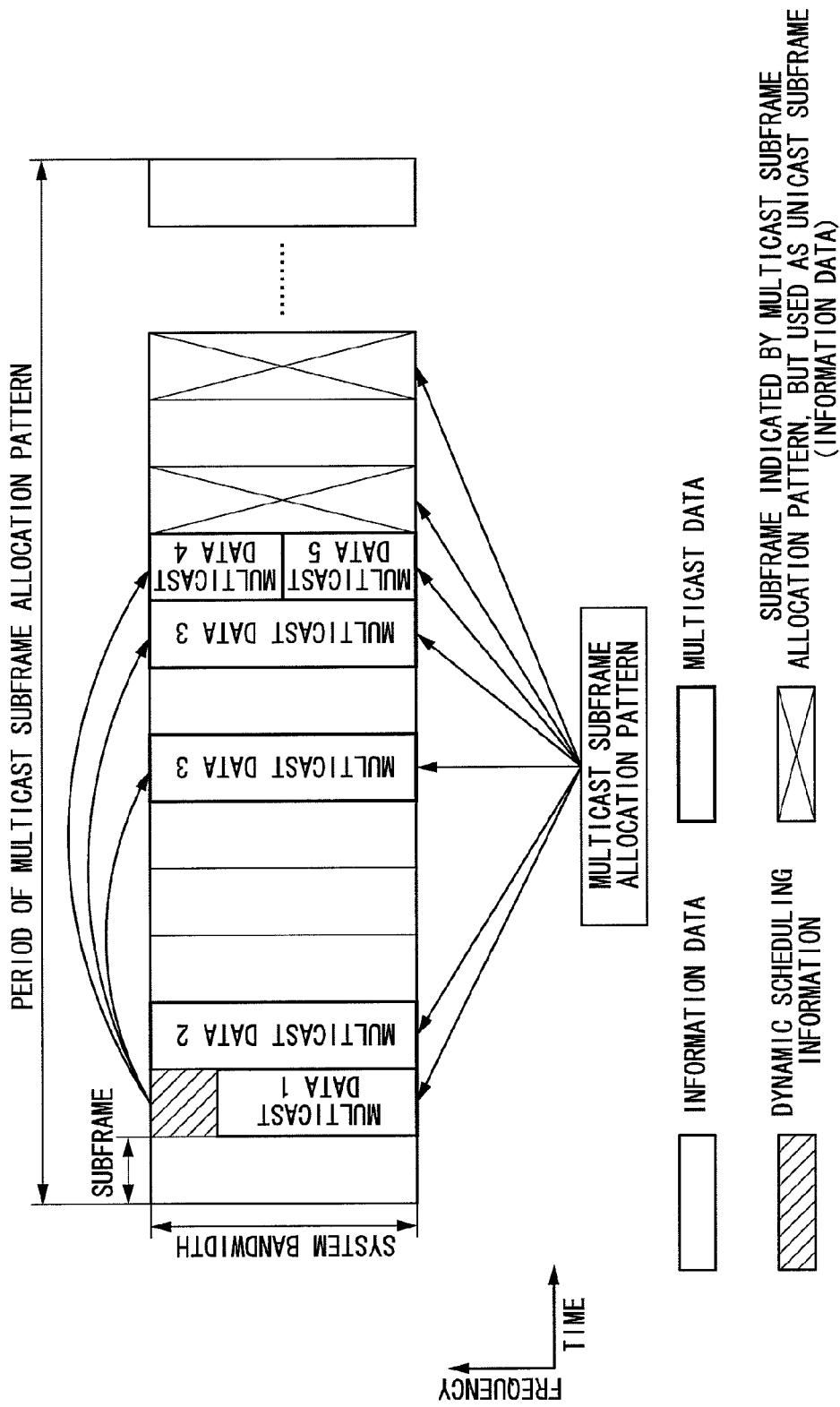
FIG. 9 illustrates a combination of a multicast sub-frame allocation pattern and dynamic scheduling information according to the present embodiment.

FIG. 9 illustrates a combination of the multicast sub-frame allocation pattern and the dynamic scheduling information according to the present embodiment. In other words, FIG. 9 illustrates sub-frames which are included in multiple sub-frames specified by the multicast sub-frame allocation pattern, the positions of the sub-frames for transmitting multicast data being not specified by the dynamic scheduling information. The horizontal and vertical axed shown in FIG. 9 denote time and frequency axes, respectively. For simplification of explanations, only the dynamic scheduling information and multicast data which are allocated to the multicast sub-frame, and information data to be allocated to the unicast sub-frame are shown. Other data allocated to each sub-frame is not shown.

The dynamic scheduling information is denoted by a rectangle hatched with diagonal lines (the first sub-frame specified by the multicast sub-frame allocation pattern). The multicast data is denoted by a thick-frame rectangle (the first to fifth sub-frames specified by the multicast sub-frame allocation pattern). The information data is denoted by a thin-frame rectangle (sub-frame not specified by the multicast sub-frame allocation pattern). A sub-frame, which is specified by the multicast sub-frame allocation pattern, but which does not transmit multicast data, is denoted by a cross-marked rectangle (the sixth and seventh sub-frames specified by the multicast sub-frame allocation pattern).

Five multicast data pieces of multicast data 1 to multicast data 5 are allocated in the first to thirteenth sub-frames in the period of the multicast sub-frame allocation pattern shown in FIG. 9. Further, one dynamic scheduling information piece, which indicates the positions of multicast data 1 to multicast data 5 specified by the multicast sub-frame allocation pattern, is allocated.

The multicast sub-frame allocation pattern indicates the second, third, seventh, ninth, tenth, eleventh, and thirteenth sub-frames. However, the dynamic scheduling information indicates only the second, third, seventh, ninth, and tenth sub-frames. Therefore, multicast data pieces are not allocated to the eleventh and thirteenth sub-frames.

The multiplexer 36 can allocate a transmission signal of data outputted from the downlink shared data channel processor 31 to such sub-frames.

The multiplexer 36 allocates uplink radio resource assignment information and transmit power command information to the sub-frames which are included the sub-frames specified by the multicast sub-frame allocation pattern, and which are specified by the dynamic scheduling information, that are the multicast frames. Additionally, the multiplexer 36 allocates downlink radio resource assignment information, uplink radio resource assignment information, and transmit power command information to the sub-frames to which the transmission signal of data outputted from the downlink shared data channel processor 31, in other words, the unicast sub-frames, is allocated, and which are included in the sub-frames specified by the multicast sub-frame allocation pattern, but which are not specified by the dynamic scheduling information.

<Per-Transmit Antenna Transmission Processor 37>

The IFFT unit 371 performs inverse fast Fourier transform on the signal received from the multiplexer 36, and then performs OFDM modulation. Based on the control signal from the controller 11, the GI inserter 372 adds a guard interval to the signal having been subjected to the OFDM modulation by the IFFT unit 371, and thus forms OFDM symbols. The OFDM symbols become a baseband digital signal. The guard interval is obtained by a known method of duplicating the head and end portions of symbols to be transmitted. The GI inserter 372 multiplexes extra samples (shown in FIG. 4) in case of the multicast sub-frame. The D/A unit 373 converts the baseband digital signal received from the GI inserter 372 into an analog signal.

The RF transmitter 374 generates, from the analog signal received from the D/A unit 373, the same-phase element and orthogonal element of the intermediate frequency, removes frequency elements that are unnecessary for the intermediate frequency, converts (upconverts) the intermediate frequency signal into a high frequency signal, removes unnecessary frequency elements, performs power amplification, and outputs the amplified signal to the corresponding transmit antenna. The base station device 1 includes the per-antenna transmission processor 37, the number of which corresponds to the number of transmit antennas used for transmission, i.e., five in the present embodiment. Then, the per-antenna transmission processor 37 processes a signal addressed to the corresponding transmit antenna, the signal being included in the signals addressed to the respective transmit antennas which are outputted by the multiplexer 36.

<Outline of Mobile Station Device 2>

The mobile station device 2 of the present embodiment receives a signal addressed to the mobile station device 2 from the sub-frames transmitted by the base station device 1. The mobile station device 2 determines that the sub-frame indicated by the dynamic scheduling information to include multicast data is a multicast sub-frame, the sub-frame being included in sub-frames specified by the multicast sub-frame allocation pattern transmitted by the system information on the downlink shared data channel. On the other hand, the mobile station device 2 determines that the sub-frame not indicated by the dynamic scheduling information to include multicast data is a unicast sub-frame, the sub-frame being included in sub-frames specified by the multicast sub-frame allocation pattern transmitted by the system information on the downlink shared data channel. Then, the mobile station device 2 switches a downlink control channel decoding method between when the sub-frame specified by the multicast sub-frame allocation pattern is determined to be the unicast sub-frame and when the sub-frame is determined to be the multicast sub-frame, and thereby reducing the processing load.

<Block Diagram of Mobile Station Device 2>

Figure 10:
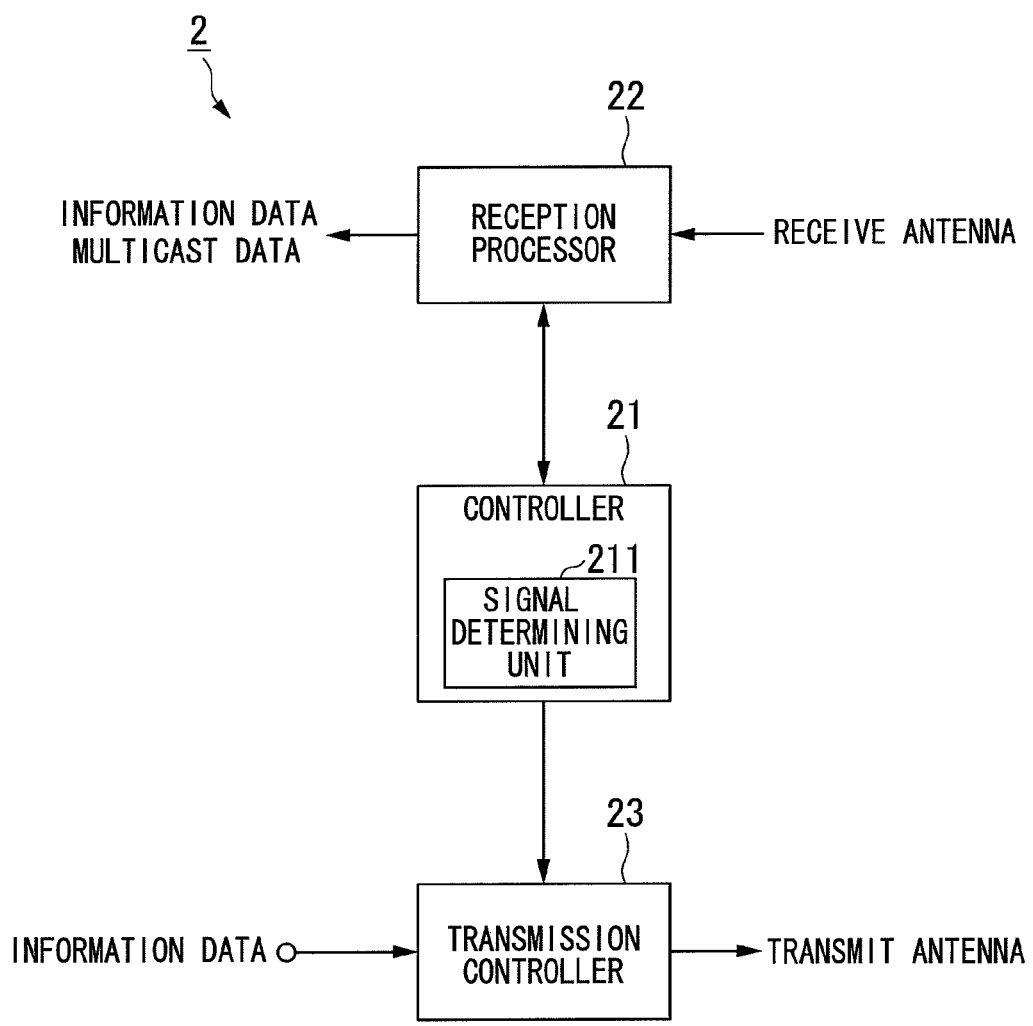
FIG. 10 is a schematic block diagram illustrating the configuration of a mobile station device 2 according to the present embodiment.

FIG. 10 is a schematic block diagram illustrating the configuration of the mobile station device 2 according to the present embodiment. As shown in FIG. 10, the mobile station device 2 includes a controller 21, a reception processor 22, and a transmission processor 23. The reception processor 22 performs a reception process on the downlink control channel, the downlink shared data channel, the multicast channel, the downlink pilot channel, and the control format indicator channel, which are received from the base station device 1 via the receive antenna. The reception processor 22 outputs, to the controller 21, the control data informed using the downlink control channel, the system information informed using the downlink shared data channel and the broadcast channel, the control format indicator signal informed using the control format indicator channel, and the dynamic scheduling information informed using the multicast channel. The reception processor 22 outputs, to an external unit, the information data informed using the downlink shared data channel, and the multicast data informed using the multicast channel.

The controller 21 controls the transmission processor 23 and the reception processor 22 based on the control data informed by the base station device 1 using the downlink control channel, the system information informed using the downlink shared data channel and the broadcast channel, the control format indicator signal informed using the control format indicator channel, and the dynamic scheduling information informed using the multicast channel.

The controller 21 includes a signal determining unit 211. Based on the dynamic scheduling information and the multicast sub-frame allocation pattern received from the reception processor 22, the signal determining unit (frame-type determining unit) 211 determines whether the received sub-frame is a multicast sub-frame or a unicast sub-frame. Then, the signal determining unit 211 gives, to the reception processor 22, instructions on a guard-interval removing method, a downlink control channel decoding method, and a multiplexing and demultiplexing method.

Based on the input from the controller 21, the transmission processor 23 transmits the information data received from the external unit and the control data received from the controller 21 using the uplink control channel, the uplink shared data channel, the uplink pilot channel, and the random access channel via the transmit antenna. The details of an uplink process by the transmission processor 23 have no direct relation to the present invention, and therefore explanations thereof are omitted here.

<Reception Processor 22 of Mobile Station Device 3>

Figure 11:
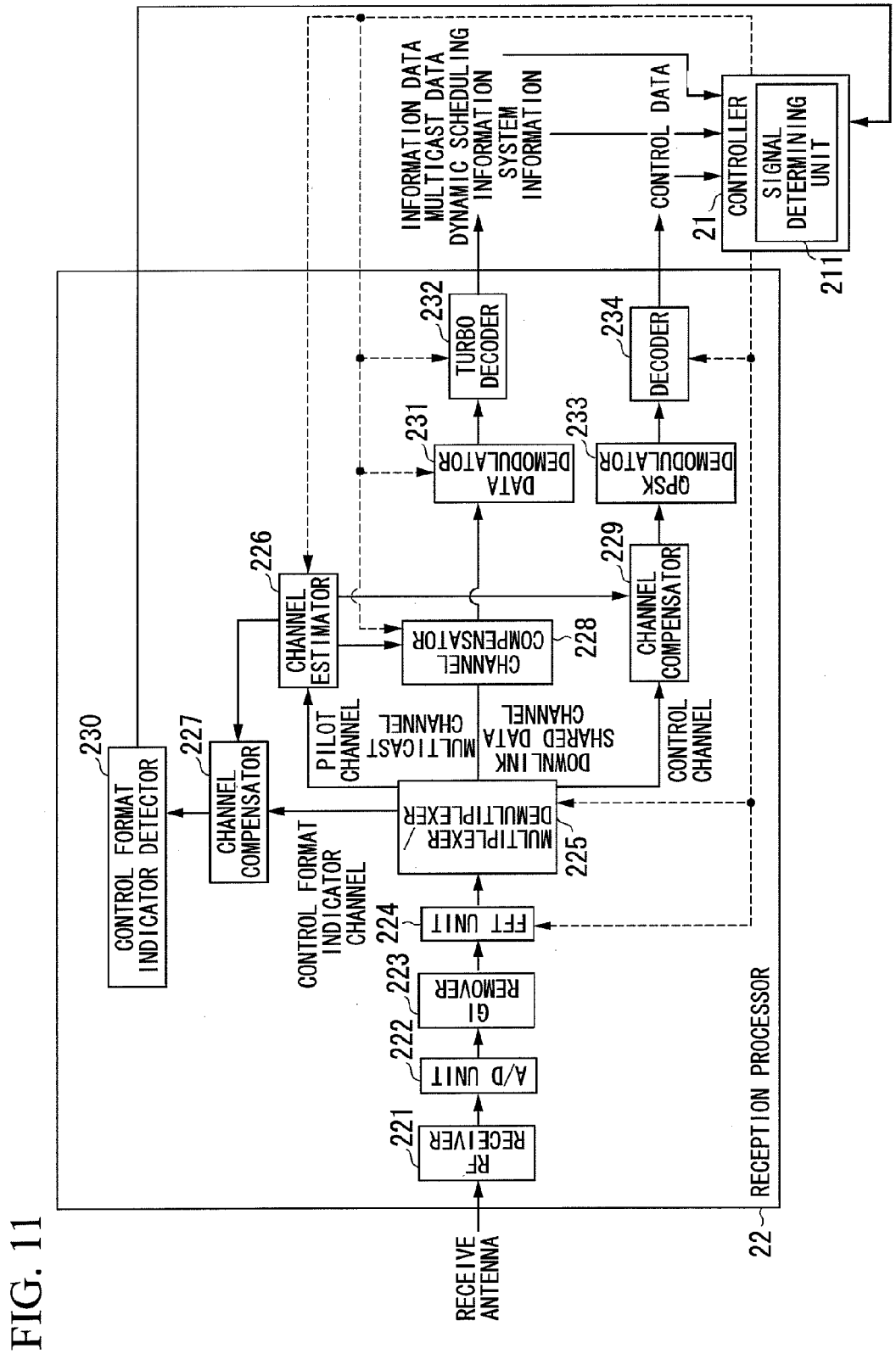
FIG. 11 is a schematic block diagram illustrating the internal configuration of a reception processor 22 of the mobile station device 2 according to the present embodiment.

FIG. 11 is a schematic block diagram illustrating the internal configuration of the reception processor 22 of the mobile station device 2 according to the present embodiment. The reception processor 22 of the mobile station device 2 includes: an RF (Radio Frequency) receiver 221; an A/D (Analog/Digital) unit 222; a GI (Guard Interval) remover 223; an FFT (Fast Fourier Transform) unit 224; a multiplexer/demultiplexer 225; a channel estimator 226; a channel compensator 227, 228, and 229; a control format indicator detector 230; a data demodulator 231; a turbo decoder (scheduling information detector) 232; a QPSK demodulator 233; and a decoder (control data detector) 234. In the present embodiment, the RF receiver 221, the A/D unit 222, the GI remover 223, and the FFT unit 224 function as a receiver that receives a signal transmitted from the base station device 1.

The RF receiver 221 amplifies the signal received via the receive antenna, performs conversion (downconversion) to an intermediate frequency signal, removes unnecessary frequency elements, controls the amplification level to adequately maintain the signal level, and performs orthogonal decoding based on the same-phase elements and the orthogonal elements of the received signal. The A/D unit 222 converts the analog signal orthogonally-decoded by the RF receiver 221 into a digital signal. Based on the instructions from the controller 21, the GI remover 223 removes a guard interval element from the digital signal outputted from the A/D unit 222. The FFT unit 224 performs fast Fourier transform on the signal received from the GI remover 223, and then performs OFDM demodulation.

Based on the instructions from the controller 21, the multiplexer/demultiplexer 225 extracts, from the signal having been subjected to Fourier-transform by the FFT unit 224, i.e., the reception signal having been subjected to OFDM demodulation, the downlink pilot channel, the control format indicator channel, the downlink shared data channel, the multicast channel, and the downlink control channel, and outputs the extracted items.

Specifically, the multiplexer/demultiplexer 225 extracts the downlink pilot channel and the control format indicator channel which are allocated to the predetermined positions, and outputs the downlink pilot channel and the control format indicator channel to the channel estimator 226 and the channel compensator 227, respectively.

Further, based on the control format indicator signal included in the control format indicator channel that is inputted via the controller 21 and previously outputted to the channel compensator 227, the multiplexer/demultiplexer 225 extracts the downlink control channel including control data such as the radio resource assignment information determined by the controller 21, and outputs the downlink control channel to the channel compensator 229.

Moreover, based on the radio resource assignment information included in the downlink control channel that is inputted via the controller 21 and previously outputted to the channel compensator 229, the multiplexer/demultiplexer 225 extracts the downlink shared data channel, and outputs the downlink shared data channel to the channel compensator 228.

Alternatively, the multiplexer/demultiplexer 225 extracts multicast channel and outputs the multicast channels to the channel compensator 228 based on the control signal received from the signal determining unit 211 of the controller 21, which includes the multicast sub-frame allocation pattern included in the system information in the downlink shared data channel and the dynamic scheduling information included in the multicast channel in a sub-frame that is currently received or previously received.

Based on the reception results of the known reference signal allocated to the downlink pilot channel demultiplexed by the multiplexer/demultiplexer 225, the channel estimator 226 estimates a channel variation for each transmit antenna of the base station device 1, and outputs a channel variation compensation value.

Based on the channel variation compensation value from the channel estimator 226, the channel compensator 227 performs channel variation compensation on the signal of the control format indicator channel received from the multiplexer/demultiplexer 225.

The control format indicator detector 230 detects a control format indicator signal indicative of the number of OFDM symbols forming the downlink control channels, from the signal allocated to the control format indicator channel having been subjected to the channel variation compensation by the channel compensator 227. Then, the control format indicator detector 230 outputs the control format indicator signal to the controller 21.

Based on the channel variation compensation value from the channel estimator 226, the channel compensator 228 performs channel variation compensation on the signal of the downlink shared data channel and the multicast channel received from the multiplexer/demultiplexer 225.

The data demodulator 231 demodulates the downlink shared data channel and the multicast channel which have been subjected to the channel variation compensation by the channel compensator 228. The demodulation is performed based on the modulation scheme used by the data modulators 312 and 322 of the base station device 1. The modulation scheme of the downlink shared data channel is instructed from the controller 21 based on the information included in the downlink control channel. The modulation scheme of the multicast channel is specified by the controller 21 based on the system information included in the downlink shared data channel and the information included in the multicast channel.

The turbo decoder 232 decodes the downlink shared channel and the multicast channel which have been demodulated by the data demodulator 231. In other words, the turbo decoder (scheduling information detector) 232 detects the dynamic scheduling information allocated to the multicast channel from the received signal. The system information included in the downlink shared data channel decoded by the turbo decoder 232 is inputted to the controller 21. The decoding is performed correspondingly to the encoding rate used by the turbo encoder of the base station device 1. The encoding rate of the downlink shared data channel is instructed from the controller 21 based on the information included in the downlink control channel. The encoding rate of the multicast channel is instructed from the controller 21 based on the system information included in the downlink shared data channel and the information included in the multicast channel.

Based on the channel variation compensation value from the channel estimator 226, the channel compensator 229 performs channel variation compensation on the signal of the downlink control channel received from the multiplexer/demultiplexer 225.

The QPSK demodulator 233 performs QPSK demodulation on the downlink control channel having been subjected to the channel variation compensation by the channel compensator 226.

The decoder (control data detector) 234 decodes the downlink control channel demodulated by the QPSK demodulator 233. In other words, the decoder 234 detects control data including the items corresponding to the type indicated by the results of the determination by the signal determining unit 211. Upon the detection process, the data size corresponding to the items corresponding to the type indicated by the results of the determination is used. Specifically, upon rate dematching in the detection process, rate dematching is performed so that the result of the rate dematching becomes the data size. The control data included in the downlink control channel decoded by the decoder 234 is inputted to the controller 21. The details of the decoder 234 are explained later.

The controller 21 outputs a control signal to the data demodulator 231 based on the information concerning the modulation scheme included in the control data. Additionally, the controller 21 outputs a control signal to the turbo decoder 232 based on information concerning the encoding rate included in the control data.

Further, the controller 21 outputs a control signal to the multiplexer/demultiplexer 225 so as to extract, from the allocated resource elements, the downlink control channel of the mobile station device 2 based on the control format indicator signal.

Moreover, when the control data received from the decoder 234 is the downlink radio resource assignment information, the controller 21 outputs a control signal to the multiplexer/demultiplexer 225 so as to extract, from the allocated resource elements, the downlink shared data channel of the mobile station device 2 based on the downlink radio resource assignment information.

Additionally, when the control data received from the decoder 234 is the uplink radio resource assignment information, the controller 21 outputs a control signal to the transmission processor 23 so as to transmit the uplink shared data channel based on the uplink radio resource assignment information.

Moreover, when the control data received from the decoder 234 is the transmit power command information, the controller 21 outputs a control signal to the transmission processor 23 so as to set the transmit power of the uplink shared data channel or the uplink control channel based on the transmit power command information.

The signal determining unit (frame-type determining unit) 211 stores the multicast sub-frame allocation pattern included in the system information allocated to the downlink shared data channel received from the turbo decoder 232. Then, the signal determining unit 211 determines the type of the each received frame based on the dynamic scheduling information allocated to the multicast channel received from the turbo decoder 232.

Specifically, based on the stored multicast sub-frame allocation pattern, the signal determining unit 211 recognizes a sub-frame that is specified as multicast sub-frame allocatable, and determines the type of unspecified sub-frames as the unicast sub-frame. Additionally, among the previously-recognized sub-frames that are specified as multicast sub-frame allocatable, the signal determining unit 211 determines, as the multicast sub-frame, the type of the sub-frame correlated to multicast data based on the dynamic scheduling information allocated to the multicast channel received from the turbo decoder 232. The signal determining unit 211 determines, as the unicast sub-frame, the type of a sub-frame not correlated to the multicast data based on the dynamic scheduling information among the previously-recognized sub-frames that are specified as multicast sub-frame allocatable.

Further, the signal determining unit 211 instructs, by a control signal, the channel estimator 226, the channel compensator 228, the data demodulator 231, and the turbo decoder 232 to perform a process corresponding to the received sub-frame type.

<Switching of Rate Dematching Process>

Figure 12:
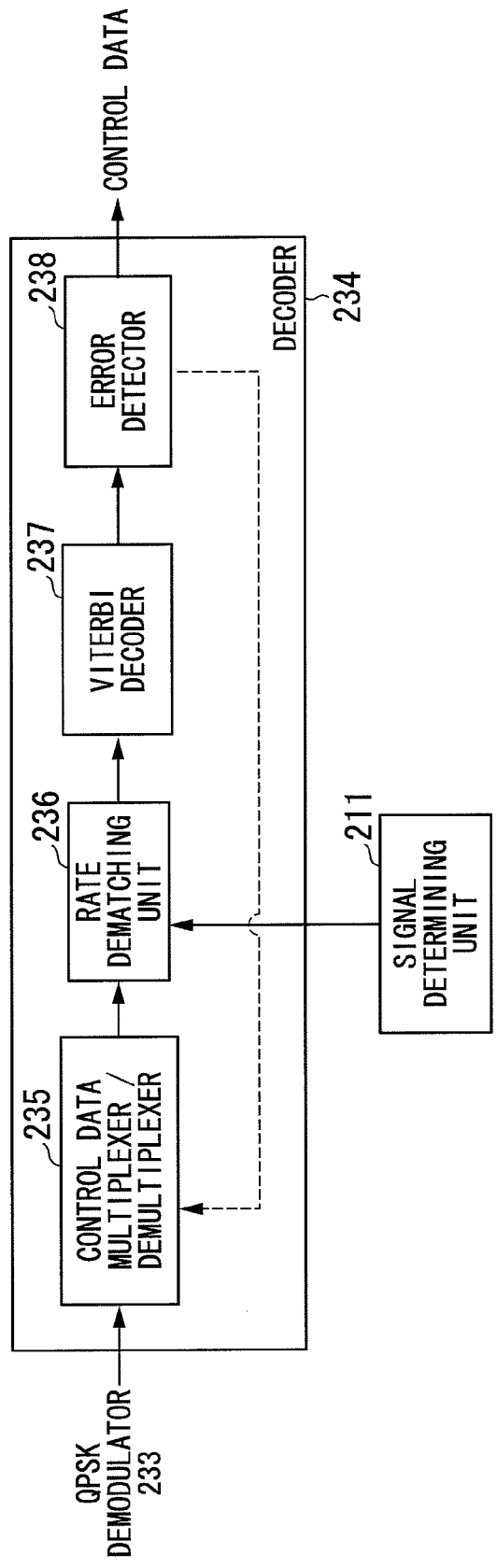
FIG. 12 is a block diagram illustrating the internal configuration of a decoder 234 of the mobile station device 1 according to the present embodiment.

FIG. 12 is a block diagram illustrating the internal configuration of the decoder 234 of the mobile station device 1. The decoder 234 includes a control data multiplexer/demultiplexer 235, a rate dematching unit 236, a Viterbi decoder 237, and an error detector 238.

The control data multiplexer/demultiplexer 235 demultiplexes the QPSK demodulation results (bit sequence) of the resource elements that have a possibility of being allocated the control data addressed to the mobile station device 2 into bit sequences of control data based on four patterns of a bit sequence for each 36 resource elements, a bit sequence for each 72 resource elements, a bit sequence for each 144 resource elements, and a bit sequence for each 238 resource elements. Then, the control data multiplexer/demultiplexer 235 outputs the demultiplexed bit sequences to the rate dematching unit 236.

Based on the control signal for specifying the sub-frame type from the signal determining unit 211, the rate dematching unit 236 performs rate dematching on the bit sequences of the control data received from the control data multiplexer/demultiplexer 235 so as to match the data length of each item of possible control data. Then, the rate dematching unit 236 outputs the resultant bit sequences to the Viterbi decoder 237.

In other words, when the signal determining unit 211 determines that the sub-frame specified by the multicast sub-frame allocation pattern is the multicast sub-frame, since the control data does not include the downlink radio resource assignment information, the signal determining unit 211 instructs, using a control signal, the rate dematching unit 236 to perform rate dematching assuming that the control data received from the control data multiplexer/demultiplexer 235 is control data other than the downlink radio resource assignment information. In other words, when the signal determining unit 211 determines the sub-frame to be the multicast sub-frame, the control data multiplexer/demultiplexer 235 does not perform, on the determined sub-frame, rate dematching using a rate matching pattern resulting in the length of the downlink radio resource assignment information after the rate dematching. Accordingly, a processing load of detecting control data can be reduced.

When the signal determining unit 211 determines that the sub-frame specified by the multicast sub-frame allocation pattern is the unicast sub-frame, the signal determining unit 211 instructs, using a control signal, the rate dematching unit 236 to perform rate dematching assuming that the control data received from the control data multiplexer/demultiplexer 235 is the downlink radio resource assignment information, the uplink radio resource assignment information or the transmit power command information.

The Viterbi decoder 237 convolutionally-decodes the control data received from the rate dematching unit 236, and then outputs the results of the decoding to the error detector 238.

The error detector 238 extracts an error detection code multiplexed with the control data received from the Viterbi decoder 237, and then performs error detection. If errors are detected, the error detector 238 instructs, using a control signal, the control data multiplexer/demultiplexer 235 to perform a decoding process with an untried combination of resource elements and rate dematching (data length). If no error is detected, the error detector 238 outputs a control data to the controller 21, and then instructs the data multiplexer/demultiplexer 235 to perform an untried decoding process.

<Flowchart of Signal Determining Unit 211>

Figure 13:
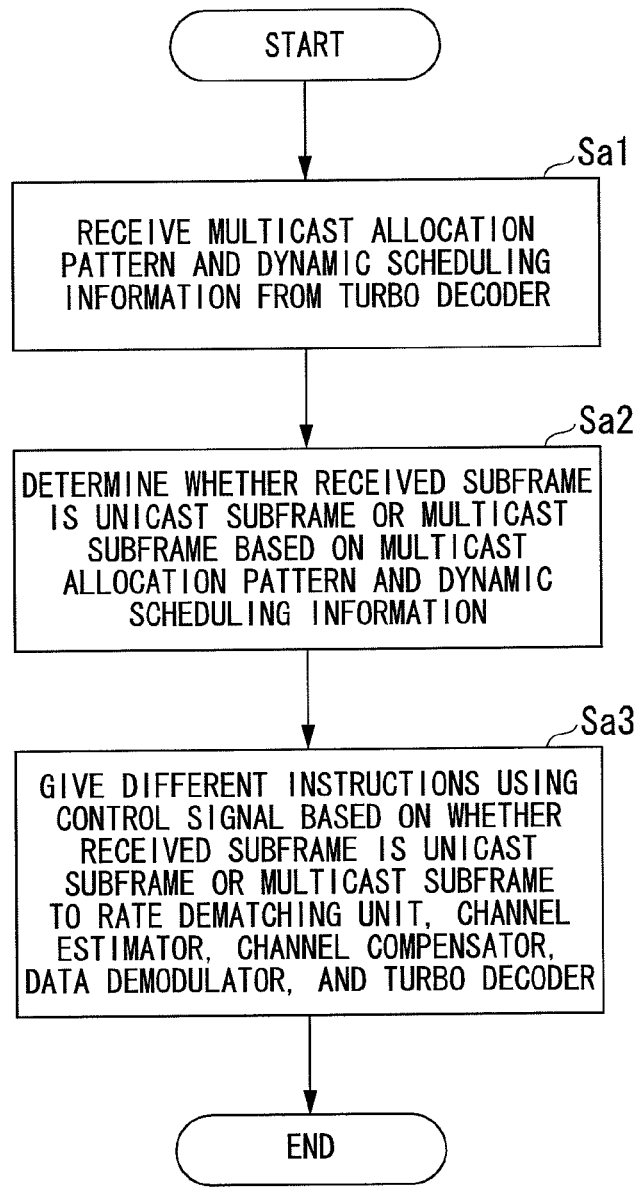
FIG. 13 is a flowchart illustrating an example operation of a signal determining unit 211 of the mobile station device 2 according to the present embodiment.

FIG. 13 is a flowchart illustrating an example operation of the signal determining unit 211 of the mobile station device 2. The signal determining unit 211 receives, from the turbo decoder 232, the multicast sub-frame allocation pattern and the dynamic scheduling information (Sa1). Then, the signal determining unit 232 determines, from the multicast sub-frame allocation pattern and the dynamic scheduling information, whether the received sub-frame is the multicast sub-frame or the unicast sub-frame (Sa2).

Then, the signal determining unit 211 gives, using a control signal, different instructions to the rate dematching unit 236, the channel estimator 226, the channel compensator 228, the data demodulator 231, and the turbo decoder 231 to perform a process corresponding to the received sub-frame type (the multicast sub-frame or the unicast sub-frame) (Sa3).

<Flowchart of Rate Dematching Unit 236>

Figure 14:
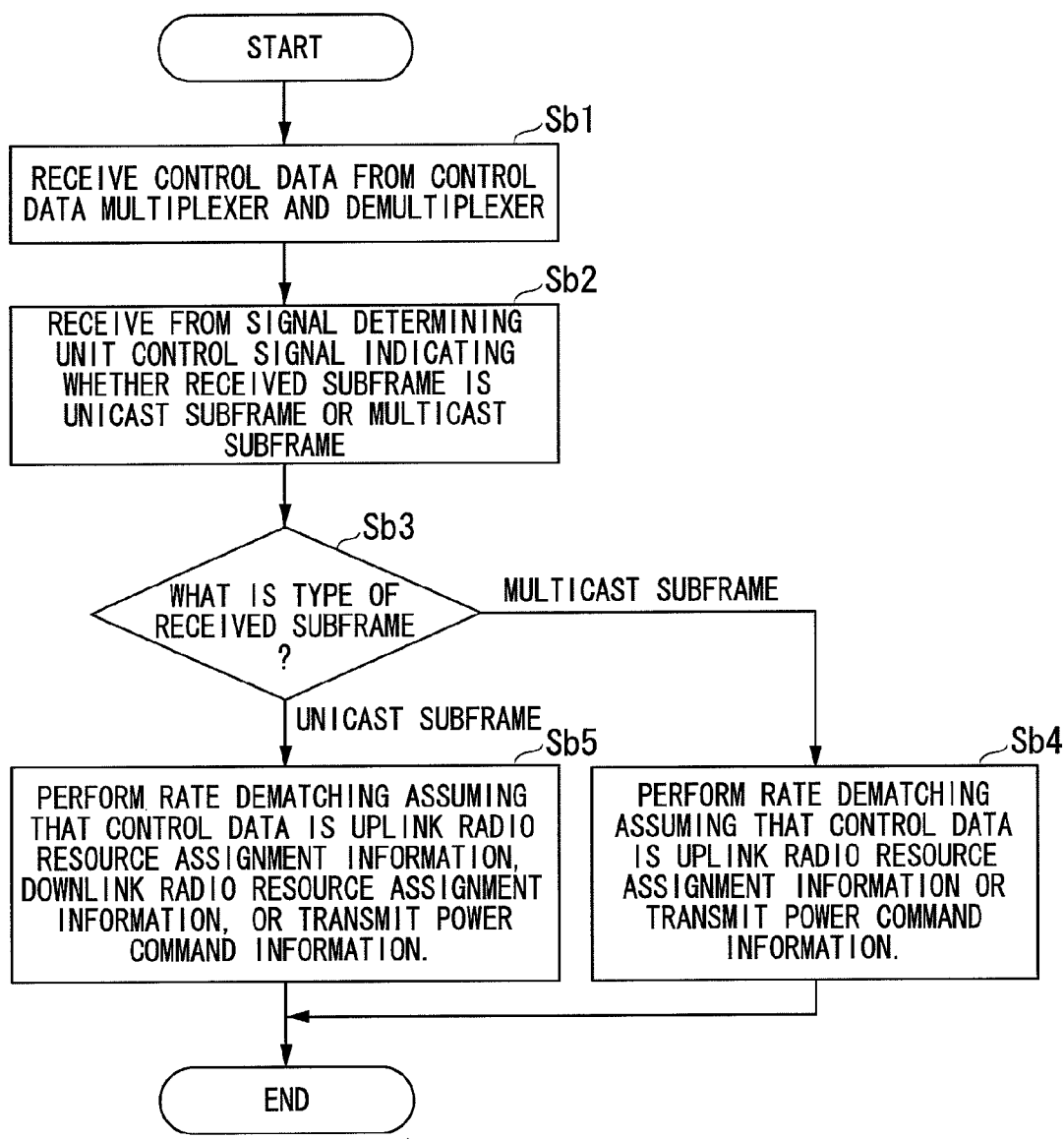
FIG. 14 is a flowchart illustrating an example operation of a rate dematching unit 236 of the mobile station device 2 according to the present embodiment.
Figure 15:
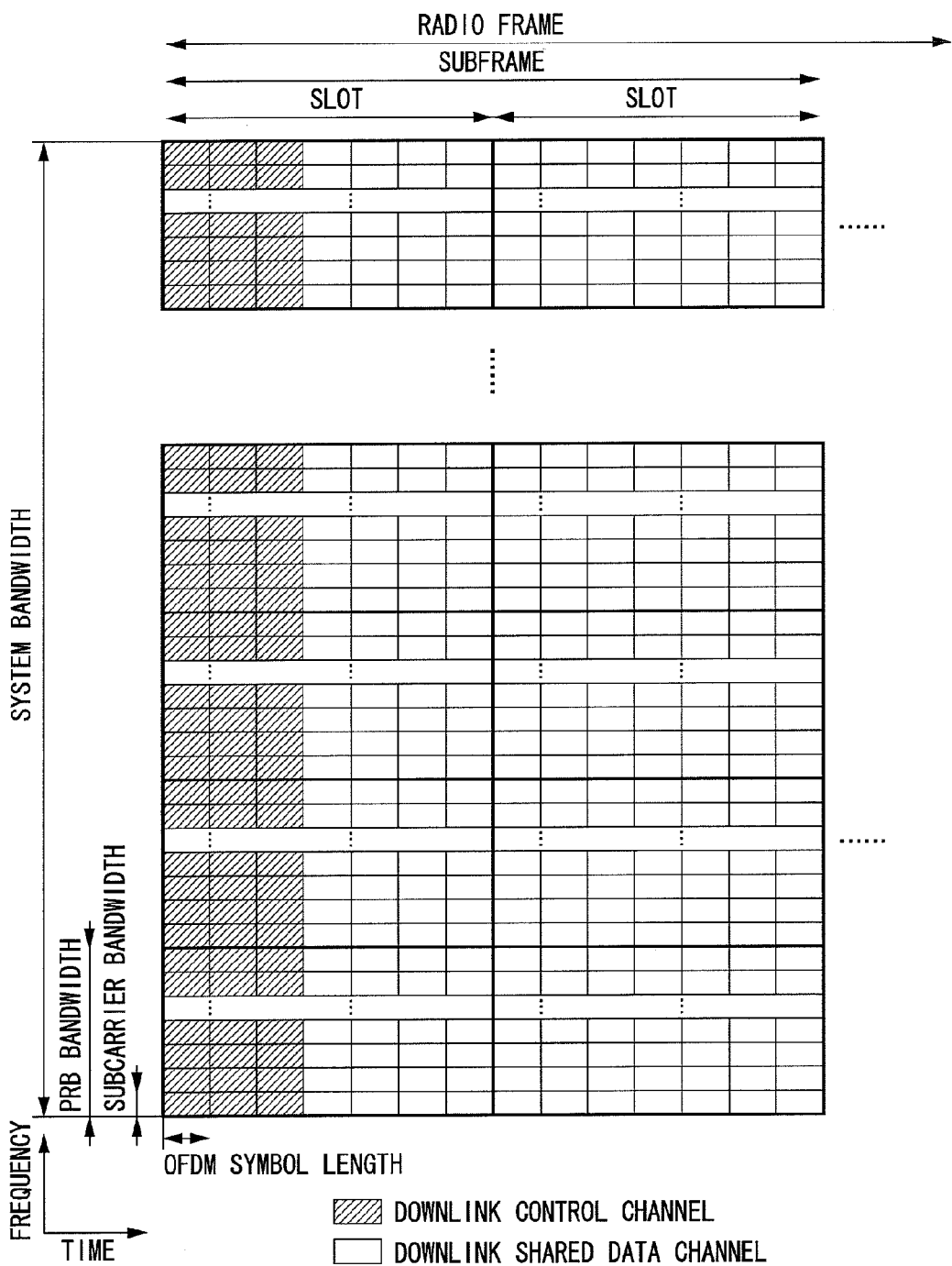
FIG. 15 illustrates a schematic structure of a radio frame in a conventional E-UTRA downlink.
Figure 16:
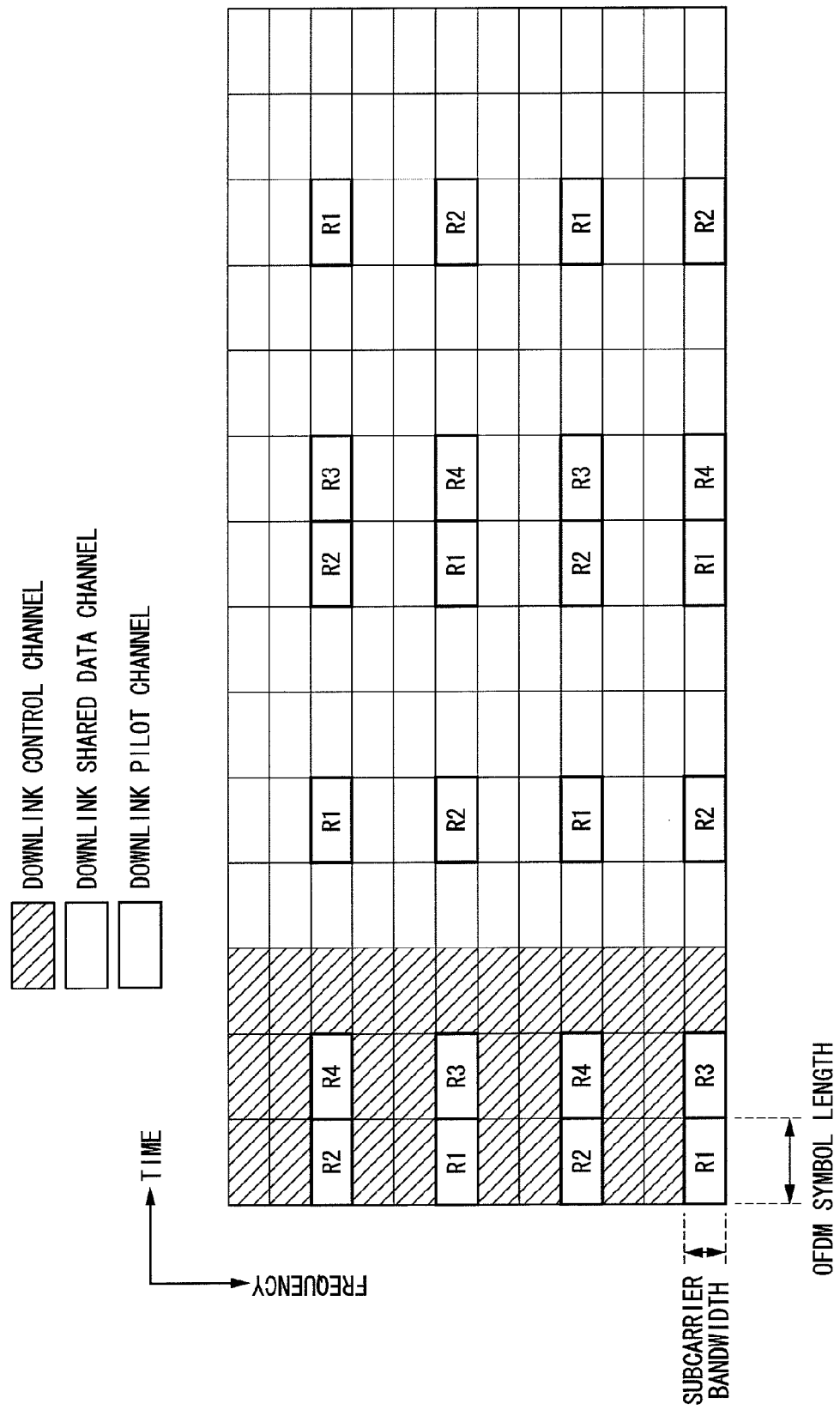
FIG. 16 illustrates allocation of downlink pilot channels included in one PRB pair in a unicast sub-frame in the conventional E-UTRA downlink.
Figure 17:
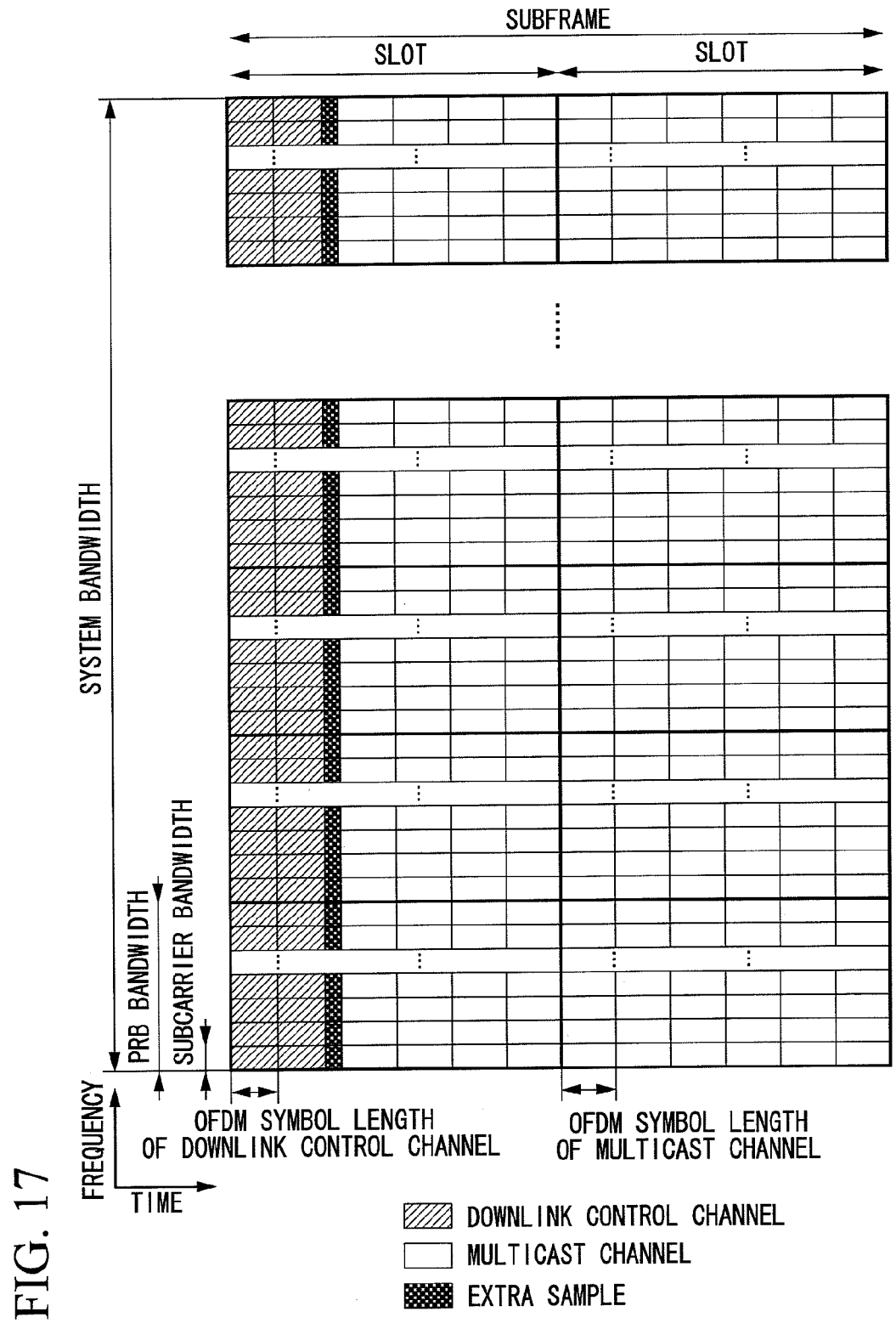
FIG. 17 illustrates a schematic structure of a multicast sub-frame in the conventional E-UTRA downlink.
Figure 18:
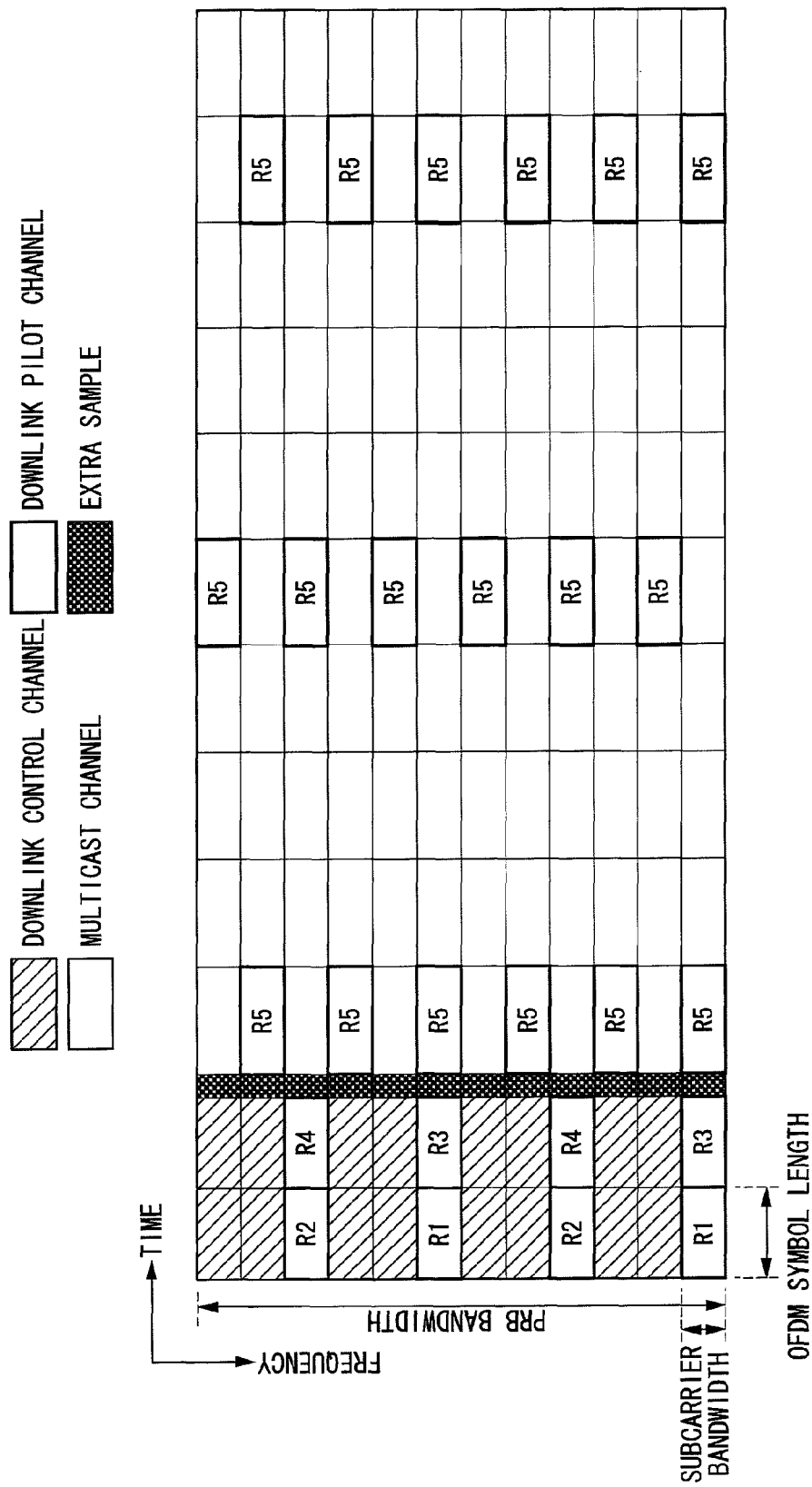
FIG. 18 illustrates allocation of downlink pilot channels included in one PRB pair in a multicast sub-frame in the conventional E-UTRA downlink
Figure 19:
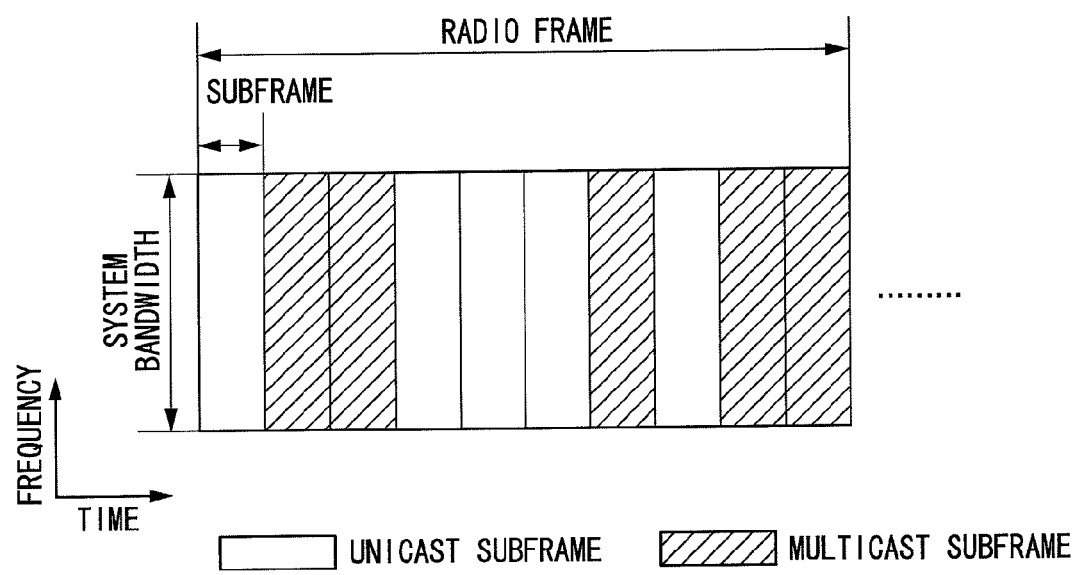
FIG. 19 illustrates a schematic structure of a radio frame for the multicast/unicast mixed cell where multi-cell transmission is performed in the conventional E-UTRA.
Figure 20:
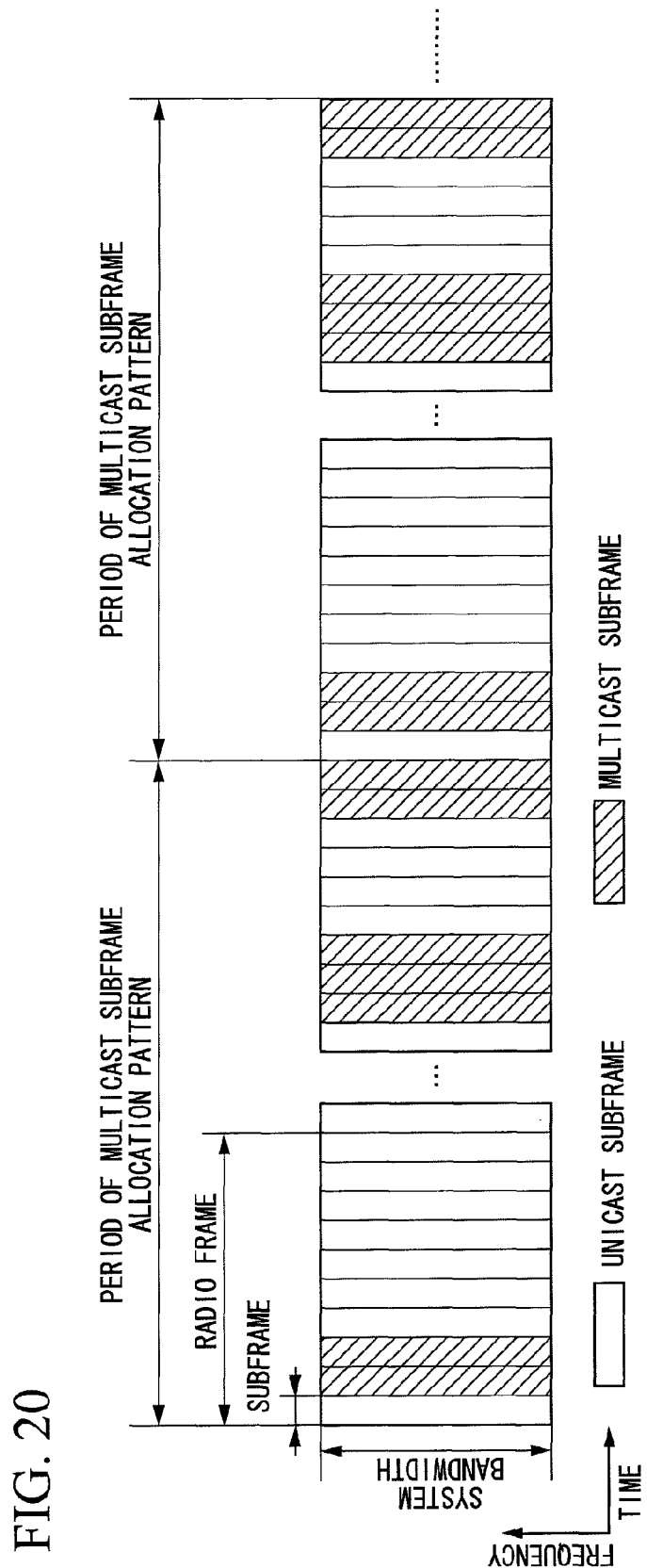
FIG. 20 illustrates a multicast sub-frame allocation pattern for the multicast/unicast mixed cell in which multi-cell transmission is performed in the conventional E-UTRA.
Figure 21:
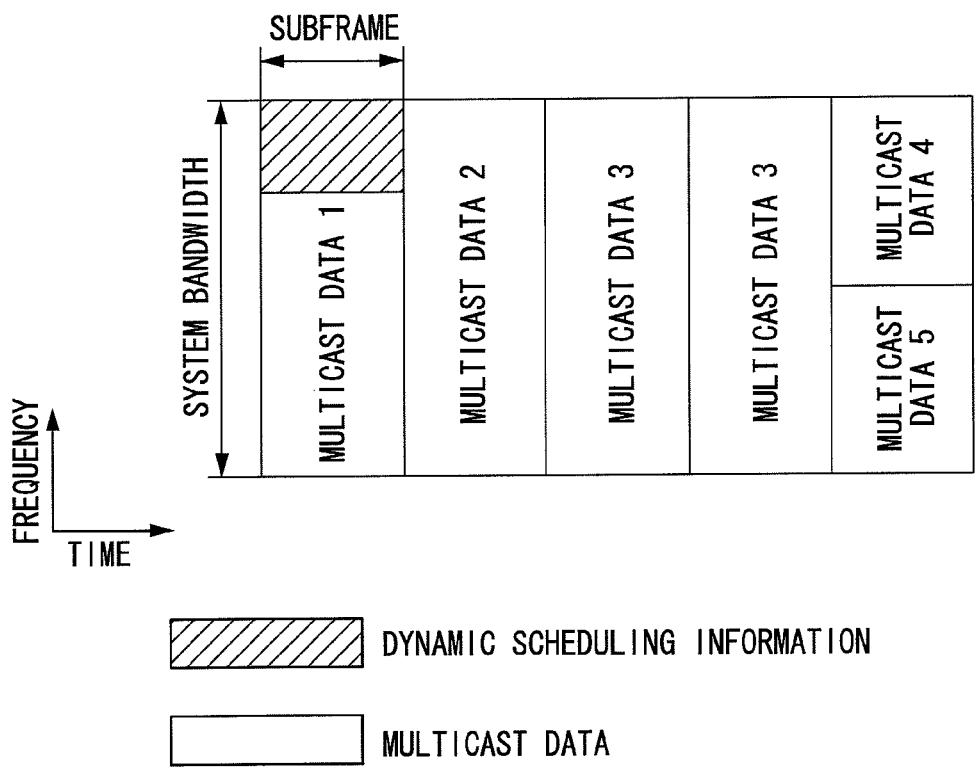
FIG. 21 illustrates dynamic scheduling information in the conventional E-UTRA.
Figure 22:
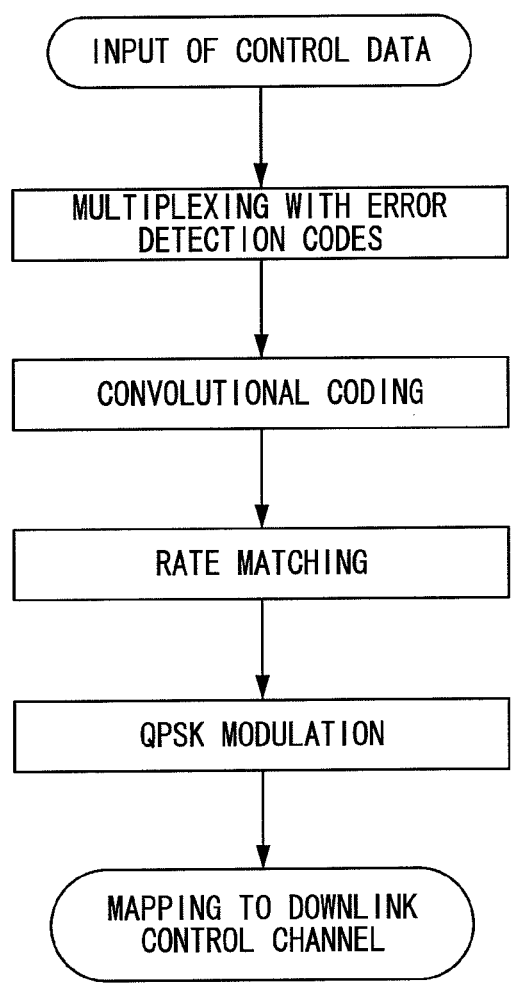
FIG. 22 is a flowchart illustrating an example procedure of coding control data to be allocated to a downlink control channel in the conventional E-UTRA.
Figure 23:
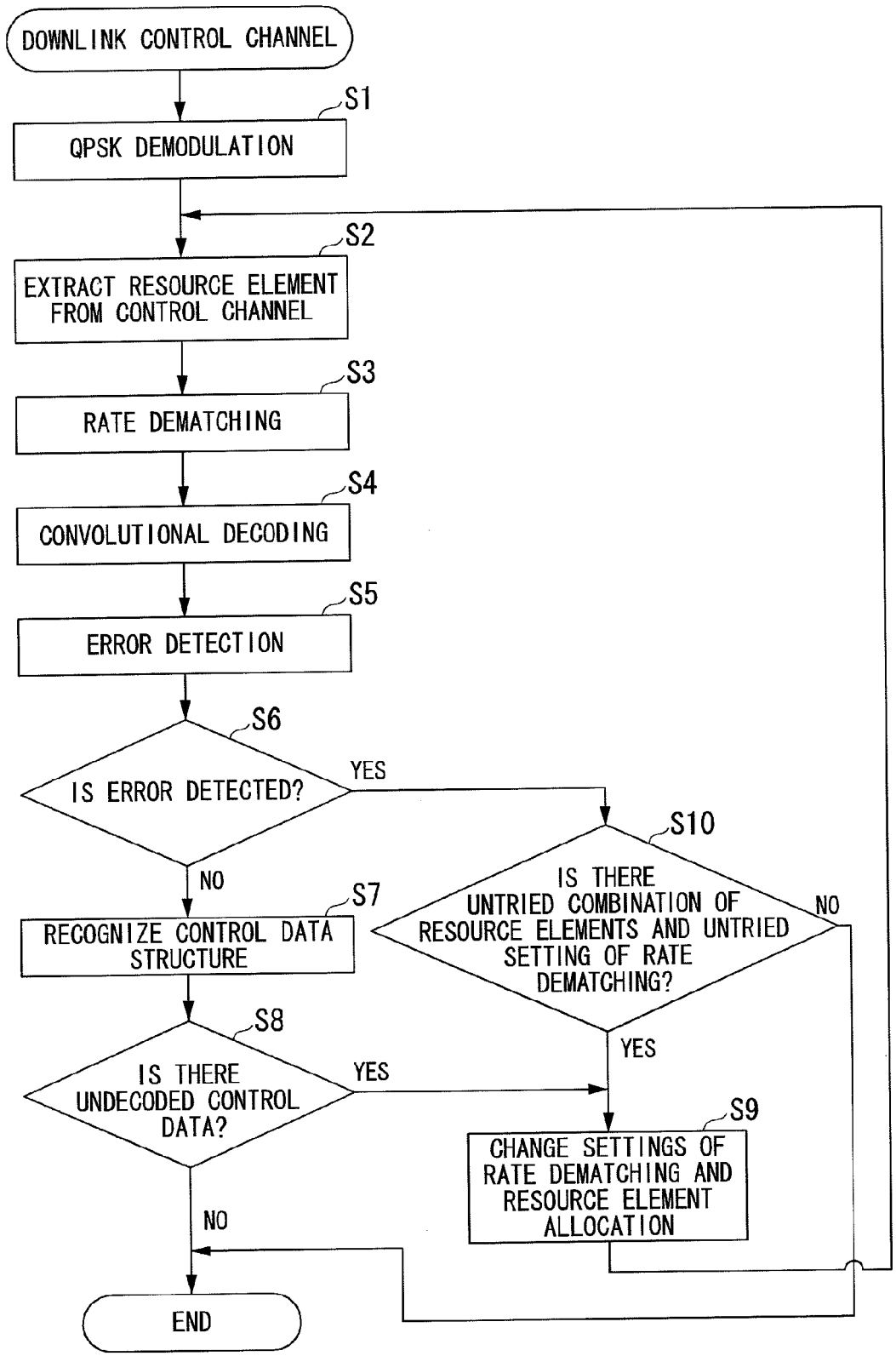
FIG. 23 is a flowchart illustrating an example procedure of decoding control data to be allocated to a downlink control channel in the conventional E-UTRA.

FIG. 14 is a flowchart illustrating an example operation of the rate dematching unit 236 of the mobile station device 2. A control data is inputted from the control data multiplexer/demultiplexer 235 to the rate dematching unit 236 (Sb1). Then, a control signal indicating whether the sub-frame received from the signal determining unit 211 is the multicast sub-frame or the unicast sub-frame is inputted to the rate dematching unit 236 (Sb2).

When the control signal received from the signal determining unit 211 indicates the multicast sub-frame (Sb3: Multicast Sub-frame), the rate dematching unit 236 performs rate dematching assuming that the control data is the uplink radio resource assignment information or the transmit power command information (Sb4).

When the control signal received from the signal determining unit 211 indicates the unicast sub-frame (Sb3: Unicast Sub-frame), the rate dematching unit 236 performs rate dematching assuming that the control data is the downlink radio resource assignment information, the uplink radio resource assignment information, or the transmit power command information (Sb5).

As shown in steps Sb4 and Sb5, the rate dematching unit 236 included in the decoder 234 performs a rate dematching process for detecting control data including the item corresponding to the type indicated by the results of determining the sub-frame type by the signal determining unit 211, thereby achieving remarkable effects of reducing the processing load of detecting control data.

A program, which is executed by the mobile station device related to the present invention, is a program (computer functioning program) for controlling a CPU (Central Processing Unit) and the like to implement the functions of the present embodiment related to the present invention. The information pieces used by these devices are temporarily stored in RAM (Random Access Memory) upon processing, and thereafter stored in various ROM (Read Only Memory) and HDD (Hard Disk Drive), such as Flash ROM. Then, the information is read, corrected, and written by the CPU according to need.

A computer-readable recoding medium may include a program for implementing functions of: the radio resource controller 10 and the controller 11, which are shown in FIG. 6; the downlink shared data channel processor 31, the multicast channel processor 32, the downlink control channel processor 33, the reference signal generator 34, the control format indicator signal generator 35, the multiplexer 36, the IFFT unit 371, the GI inserter 372, and the D/A unit 373, which are shown in FIG. 7; the error detection multiplexer 333, the convolutional encoder 334, and the rate matching unit 335, which are shown in FIG. 8; the controller 21 and the signal determining unit 211 which are shown in FIG. 10; the A/D unit 222, the GI remover 223, the FFT unit 224, the multiplexer/demultiplexer 225, the channel estimator 226, the channel compensator 227, the control format indicator detector 230, the channel compensator 228, the data demodulator 231, the turbo decoder 232, the channel compensator 229, the QPSK demodulator 233, the decoder 234, the controller 21, and the signal determining unit 211, which are shown in FIG. 11; and the control data multiplexer/demultiplexer 235, the rate dematching unit 236, the Viterbi decoder 237, and the error detector 238, which are shown in FIG. 12. Then, a computer system may read and execute the program stored in the recording medium, and thus executes the process of each unit. Here, the "computer system" includes an OS and hardware such as peripheral devices.

The "computer readable recording medium" is a portable medium such as a flexible disc, magneto-optical disc, ROM or CD-ROM, or a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, or a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include modifications without departing from the scope of the present invention.

INDUSTRIAL APPLICABILITY

The present invention is suitable to, but is not limited to, a mobile communication system including a mobile telephone terminal as a mobile station device.

REFERENCE SIGNS LIST

1: base station device
10: radio resource controller
11: controller
12: reception processor
13: transmission processor
31: downlink shared data channel processor
32: multicast channel processor
33: downlink control channel processor
34: reference signal generator
35: control format indicator signal generator
36: multiplexer
37: per-transmit antenna transmission processor
311: turbo encoder
312: data modulator
321: turbo encoder
322: data modulator
331: encoder
332: QPSK modulator
333: error detection code multiplexer
334: convolutional encoder
335: rate matching unit
371: IFFT unit
372: GI inserter
373: D/A unit
374: RF transmitter
2: mobile station device
21: controller
22: reception processor
23: transmission processor
211: signal determining unit
221: RF receiver
222: A/D unit
223: GI remover
224: FFT unit
225: multiplexer/demultiplexer
226: channel estimator
227, 228, and 229: channel compensator
230: control format indicator detector
231: data demodulator
232: turbo decoder
233: QPSK demodulator
234: decoder
235: control data multiplexer/demultiplexer
236: rate matching unit
237: Viterbi decoder
238: error detector

The invention claimed is:

1. A mobile station device configured to communicate with a base station device, the mobile station device comprising:
a reception processor configured to:
receive a MBSFN (Multicast/Broadcast over Single Frequency Network) sub-frame and a unicast sub-frame from the base station device, the MBSFN sub-frame being used for receiving MBMS (Multimedia Broadcast/Multicast Service) data using a multicast channel and receiving unicast data using a downlink shared data channel, and the unicast sub-frame being used for receiving the unicast data using the downlink shared data channel,
receive from the base station device using the downlink shared data channel, sub-frame specifying information that specifies a plurality of sub-frames reserved as the MBSFN sub-frames, and
receive from the base station device using the multicast channel, scheduling information that specifies a plurality of sub-frames for transmitting the MBMS data from among the plurality of the sub-frames reserved as the MBSFN sub-frames, and
a decoding processor configured to:
attempt to decode downlink control information indicating radio resource assignment for the downlink shared data channel in one of the plurality of the sub-frames reserved as the MBSFN sub-frames, the one of the plurality of the sub-frames being different from a sub-frame for transmitting the MBMS data which is indicated based on the scheduling information and which is included in the plurality of sub-frames, and
decode the downlink shared data channel in the one of the plurality of the sub-frames reserved as the MBSFN sub-frames in a case that a downlink control channel including the downlink control information is detected in the one of the plurality of the sub-frames reserved as the MBSFN sub-frames,
wherein the multicast channel, the downlink shared data channel and the downlink control channel are mapped to physical resources.

2. The mobile station device according to claim 1, wherein the reception processor is configured not to attempt to decode the downlink control information indicating radio resource assignment for the downlink shared data channel in the one of the plurality of the sub-frames reserved as the MBSFN sub-frames in a case that the one of the plurality of the sub-frames is reserved as the MBSFN sub-frame and the reception processor decodes the MBMS data in the one of the plurality of the sub-frames based on the scheduling information that specifies sub-frames for transmitting the MBMS data.

3. The mobile station device according to claim 1, wherein the reception processor is configured to attempt to decode the downlink control information indicating radio resource assignment for an uplink shared channel in the one of the plurality of the sub-frames reserved as the MBSFN sub-frames regardless of whether or not the reception processor decodes the MBMS data in the one of the plurality of the sub-frames based on the scheduling information that specifies sub-frames for transmitting the MBMS data.

4. A wireless communication method for a mobile station device configured to communicate with a base station device, the wireless communication method comprising:
receiving a MBSFN (Multicast/Broadcast over Single Frequency Network) sub-frame and a unicast sub-frame from the base station device, the MBSFN sub-frame being used for receiving MBMS (Multimedia Broadcast/Multicast Service) data using a multicast channel and receiving unicast data using a downlink shared data channel, and the unicast sub-frame being used for receiving the unicast data using the downlink shared data channel,
receiving from the base station device using the downlink shared data channel, sub-frame specifying information that specifies a plurality of sub-frames reserved as the MBSFN sub-frames;
receiving from the base station device using the multicast channel, scheduling information that specifies a plurality of sub-frames for transmitting the MBMS data from the plurality of the sub-frames reserved as the MBSFN sub-frames;

attempting to decode downlink control information indicating radio resource assignment for the downlink shared data channel in one of the plurality of the sub-frames reserved as the MBSFN sub-frames the one of the plurality of the sub-frames being different from a sub-frame for transmitting the MBMS data which is indicated based on the scheduling information and which is included in the plurality of sub-frames; and decoding the downlink shared data channel in the one of the plurality of the sub-frames reserved as the MBSFN sub-frames in a case that a downlink control channel including the downlink control information is detected in the one of the plurality of the sub-frames reserved as the MBSFN sub-frames, wherein the multicast channel, the downlink shared data channel, and the downlink control channel are mapped to physical resources.

* * * * *